US011348058B1

(12) United States Patent
Wang et al.

(10) Patent No.: US 11,348,058 B1
(45) Date of Patent: May 31, 2022

(54) BEACON-BASED DELIVERY CONFIRMATION

(71) Applicant: Amazon Technologies, Inc., Seattle, WA (US)

(72) Inventors: Zheng Wang, Sammamish, WA (US);
Yee Yan Cheng, Redmond, WA (US);
Jin Li, Sammamish, WA (US);
Shao-Wen Yang, Redmond, WA (US);
Qianchao Ban, Seattle, WA (US);
Xingang Guo, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 16/442,371

(22) Filed: Jun. 14, 2019

(51) Int. Cl.
*G06Q 10/08* (2012.01)
*G06F 16/29* (2019.01)

(52) U.S. Cl.
CPC ......... *G06Q 10/0833* (2013.01); *G06F 16/29* (2019.01); *G06Q 10/0834* (2013.01)

(58) Field of Classification Search
CPC ........................ G06Q 10/0833; G06Q 10/083
See application file for complete search history.

(56) References Cited

U.S. PATENT DOCUMENTS 10,121,118 B1* 11/2018 Kim ........................ H04W 4/80
10,157,337 B1* 12/2018 Kantor ................ G06F 16/9017
10,198,707 B1* 2/2019 Bolton ............ G06Q 10/08355
2005/0222905 A1* 10/2005 Wills .................. G06Q 30/0207
705/14.58
2013/0297523 A1* 11/2013 Karr ...................... G06Q 10/083
705/330
2014/0025524 A1* 1/2014 Sims ..................... G06Q 10/083
705/26.3
2014/0330739 A1* 11/2014 Falcone ........... G06Q 10/08355
705/338
2015/0081583 A1* 3/2015 Butler ................... H04W 4/025
705/333
2015/0294266 A1* 10/2015 Siragusa ............ G06Q 10/0833
705/333

(Continued)

OTHER PUBLICATIONS

Nguyen, Hoa-Hung; A Comprehensive Analysis of Beacon Dissemination in Vehicular Networks; May 1, 2012; 2012 IEEE 75th Vehicular Technology Conference (VTC Spring) (pp. 1-5) (Year: 2012).*

*Primary Examiner* — Omar Zeroual
*Assistant Examiner* — Duane N. Moore
(74) *Attorney, Agent, or Firm* — Lee & Hayes, P.C.

(57) ABSTRACT

A delivery confirmation of a package at a delivery location may be determined based on a communication protocol between a user device and a package device associated with the package. A user can order an item and anticipate a delivery of the item to a delivery location associated with the user. A delivery device can determine that it has entered a geographic region associated with the delivery location. The delivery device and/or a user device associated with the delivery location can determine, using the communication protocol, that the delivery device is within a range of the user device. Then, the user device can receive a package device identifier associated with the package device, determine that the package device is within the range of the user device, and determine a delivery confirmation of the package.

20 Claims, 11 Drawing Sheets

(56) References Cited

U.S. PATENT DOCUMENTS

| | | | |
|---|---|---|---|
| 2015/0349917 A1* | 12/2015 | Skaaksrud | H04W 4/029 |
| | | | 370/328 |
| 2016/0048796 A1* | 2/2016 | Todasco | G06Q 10/083 |
| | | | 705/330 |
| 2016/0063527 A1* | 3/2016 | MacDonald | G06Q 30/0205 |
| | | | 705/7.31 |
| 2016/0068264 A1* | 3/2016 | Ganesh | G05D 1/0676 |
| | | | 701/2 |
| 2016/0253624 A1* | 9/2016 | Sims | G06Q 10/0833 |
| | | | 705/333 |
| 2016/0253908 A1* | 9/2016 | Chambers | G05D 1/1064 |
| | | | 701/2 |
| 2016/0300172 A1* | 10/2016 | Bangalore | G01W 1/14 |
| 2017/0011333 A1* | 1/2017 | Greiner | G06Q 10/083 |
| 2017/0147975 A1* | 5/2017 | Natarajan | G05D 1/0676 |
| 2017/0147976 A1* | 5/2017 | Koch | G06Q 10/0836 |
| 2017/0161678 A1* | 6/2017 | Scholey | G06Q 10/0836 |
| 2017/0344998 A1* | 11/2017 | Kohli | H04L 43/16 |
| 2018/0005465 A1* | 1/2018 | Truong | H04W 12/08 |
| 2018/0012357 A1* | 1/2018 | Perez | G06Q 50/04 |
| 2018/0232979 A1* | 8/2018 | Kusens | H04W 4/02 |
| 2018/0293871 A1* | 10/2018 | Malinofsky | H04W 4/80 |
| 2019/0034873 A1* | 1/2019 | Boitel | G06K 9/00825 |
| 2019/0050805 A1* | 2/2019 | Munafo | G08G 5/0013 |
| 2019/0130349 A1* | 5/2019 | Ferguson | G06Q 10/08355 |
| 2019/0182554 A1* | 6/2019 | Schupak | H04N 21/2187 |

* cited by examiner

US 11,348,058 B1

BEACON-BASED DELIVERY CONFIRMATION

BACKGROUND

A user can order an item and expect a delivery of a package containing the item to a delivery address associated with the user. The user may want to receive a delivery confirmation of the package. In some instances, the user may have provided an incorrect delivery address and/or the courier may have delivered the package to the incorrect delivery address. This can result in a disappointing and/or frustrating consumer experience. Additionally, correctly identifying the delivery location can present technical challenges. For example, global positioning system (GPS) data can often result in location data errors that may result in a delivery of a package at an incorrect location, or may cause an individual to be unable to locate a delivery location for the package.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
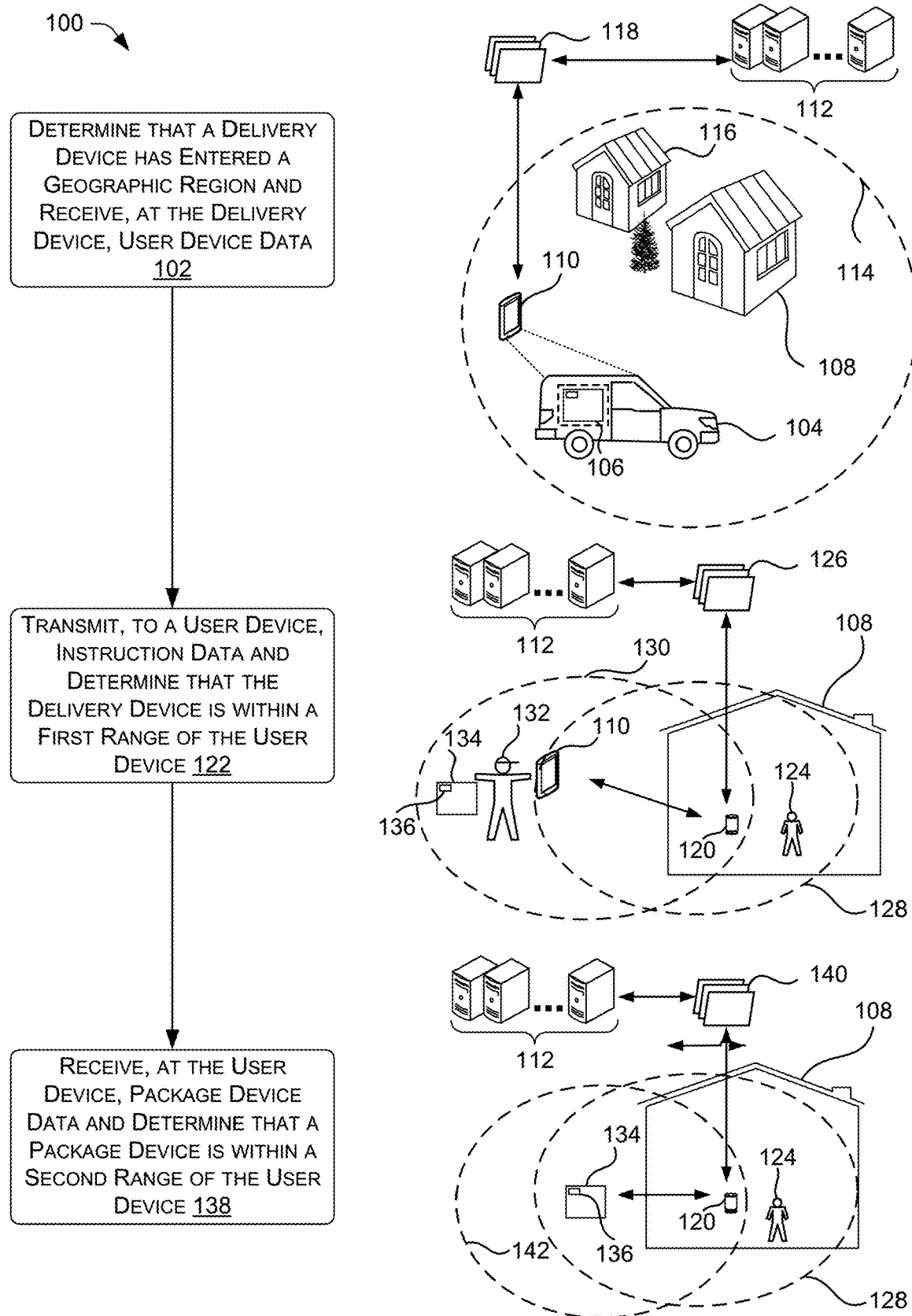
FIG. 1 is a pictorial flow diagram of an example process for determining that a package device is within a range of a user device.

A user can order an item from, for example, an Internet-based retailer. The item can be delivered as a package to a delivery location (e.g., a delivery address) provided by the user and/or associated with the user. The user may desire to receive a delivery confirmation of the package at the delivery location. In some instances, a delivery computing device can be used by a courier to communicate with a user computing device that is at the delivery location. In some instances, a package computing device (e.g., a beacon) can be associated with the package (e.g., attached to the package or placed inside the package) and the user computing device can communicate with the package computing device to determine that the package is within a proximity of the user device in order to determine that the package has been successfully delivered to the delivery location.

When a user completes an order of an item, the order data can be transmitted to a remote computing system. The order data can indicate, among other information, the item ordered, a cost of the item, a delivery location, and/or a delivery preference associated with the order and/or the user. In some instances, the user can have a default delivery preference. For example, a user can specify the default delivery preference of the user in a user account management user interface. In some instances, the user can indicate the delivery preference in a order user interface when making the order of the item.

The delivery preference can indicate, for example, that the user would like to have the item delivered in a package that includes a package computing device. As discussed above, the package computing device can be used to determine that the package is within a proximity of a user device at the delivery location in order to determine that the package has been successfully delivered to the delivery location.

The delivery preference can also be determined by the remote computing system. In some instances, the remote computing system can use an item cost threshold and, when a cost of the item meets or exceeds the item cost threshold, determine a use of the package computing device. For purposes of illustration only, the remote computing system can receive order data that indicates that the user ordered an item that costs $500 and compare the item cost to an item cost threshold of $300. After determining that the item cost of $500 meets or exceeds the item cost threshold of $300, the remote computing system can determine the delivery preference that indicates the use of the package computing device.

In some instances, the remote computing system can use an occupancy density threshold and, when an occupancy density associated with the delivery location meets or exceeds the occupancy density, determine the use of the package computing device. For example, the remote computing system can determine an occupancy density associated with the delivery location using map data and/or customer data. The map data can indicate that the delivery location is in a region that includes a plurality of potential delivery locations. For purposes of illustration only, the map data can indicate that the delivery location is within an apartment building that may have multiple delivery locations that each correspond to a different apartment within the apartment building. In some instances, the remote computing system can access customer data which can indicate that multiple deliveries have been made to different customers at or near the delivery location. Using the map data and/or the customer data, the remote computing system can determine an occupancy density by counting a number of potential customers (e.g., delivery locations) per a unit of area (e.g., 10 potential customers per 50 square meters), compare the occupancy density with the occupancy density threshold (e.g., 5 potential customers per 50 square meters), and if the occupancy density meets or exceeds the occupancy density threshold, determine the use of the package computing device with the user's order. In some instances, the remote computing system can infer an occupancy density based on a delivery address. For purposes of illustration only, a portion of the delivery address can be 1 Main St, Unit C-444 and the remote computing system can determine, based on the unit indication of "Unit C-444," that the delivery location is associated with a building that can include multiple floors and hundreds of potential customers and further determine the user of the package computing device with the user's order.

A courier, using a delivery computing device, can be assigned to deliver the package that includes the package computing device to the delivery location. In some instances, the courier can be an individual operating a vehicle such as a car, a truck, a bicycle and/or the courier can deliver the package on foot. In some instances, the courier can be an autonomous vehicle such as an autonomous car, an autonomous truck, an autonomous aerial vehicle, an unmanned aerial vehicle (UAV), and/or a robot (e.g., an autonomous robot or a robot controlled by an individual). In some instances, the delivery computing device can assist the courier by, for example, providing directions to the delivery location. In some instances, the delivery computing device can be the courier (e.g., as an autonomous vehicle, an autonomous aerial vehicle, a UAV and/or a robot). In some instances, the delivery computing device can determine a location of the delivery computing device using global positioning system (GPS) data although other types of data are contemplated such as cellular network data (e.g., 2G, 3G, 4G, 5G, GSM, CDMA, UMTS, LTE, etc.), Wi-Fi network data, and/or sensor data (e.g., image data, RADAR data, SONAR data, LIDAR data, etc.). The delivery location can be associated with a geographic region (e.g., a geofence region) and the delivery computing device can determine when the delivery computing device has entered the geographic region. For example, the delivery computing device can access map data and compare the current location of the delivery computing device with the map data and the geographic region to determine whether the delivery computing device has entered the geographic region. In some instances, the delivery computing device can store the map data within a memory of the delivery computing device. In some instances, the delivery computing device can access the map data using a wireless network such as a cellular network.

The delivery computing device can transmit an indication to the remote computing system that the delivery computing device has entered the geographic region associated with the delivery location. The delivery computing device can transmit the indication using a wireless network such as a cellular network and/or a Wi-Fi network. In some instances, the delivery computing device can transmit data to the remote computing system. In some instances, the data can include location data indicating a location of the delivery computing device. In some instances, the data can be an indication that the delivery computing device has entered a location associated with a geofence and/or that the delivery computing device is within a range of a different computing device based on a signal strength. In some instances, the remote computing system can determine that the delivery computing device has entered the geographic region associated with the delivery location.

The remote computing system, after determining that the delivery computing device has entered the geographic region associated with the delivery location, can transmit, to a user computing device that is at the delivery location, instructions to initiate a communication protocol. The user computing device can be a device that is associated with the user such as a mobile device (e.g., a cell phone, a tablet computer, a laptop, etc.), a connected device (e.g., a voice-controlled device, a smart speaker, a smart television), and/or an Internet of things device (e.g., a smart refrigerator, a smart microwave, etc.). The user computing device can include wireless connectivity such as Wi-Fi and/or Bluetooth connectivity, although other types of wireless communications are contemplated such as radio-frequency identification (RFID), cellular, or satellite connectivity. In some instances, the communication protocol can include a discovery protocol to discover and/or scan for and identify the delivery computing device. In some instances, the communication protocol can include a broadcast protocol to enable a discovery and identification of the user computing device by the delivery computing device. In some instances, the remote computing system can transmit a computing device identifier to the delivery computing device and/or the user computing device. Examples of a computing device identifier can include a universally unique identifier (UUID), although other types of identifiers are contemplated such as a media access control (MAC) address, a Wi-Fi access point name, and/or other generated values/identifiers based on random number generating algorithms (e.g., a pseudorandom number generator) and/or other number generating algorithms. The communication protocol can include broadcasting the computing device identifier (e.g., initiating a Wi-Fi access point using the Wi-Fi access point name) to allow the delivery computing device to discover the user computing device or allow the user computing device to discover the delivery computing device.

In some instances, the delivery computing device may not have connectivity to the remote computing system. For purposes of illustration only, the delivery computing device may not have a cellular/Wi-Fi antenna and/or may be in a location where it cannot connect to a network to connect to the remote computing system due to poor coverage. In some instances, the remote computing system can transmit instructions to the user computing device to initiate the communication protocol without determining that the delivery computing device has entered the geographic region associated with the delivery location. For example, the remote computing system can determine an estimated delivery time (also referred to as a transit time) at a time of order of the item or at a time of dispatch for delivery by the courier. Based on the estimated delivery time, the remote computing system can transmit the instructions to the user computing device to initiate the communication protocol. The delivery computing device can, in some instances, continuously or periodically execute the discovery protocol and/or the broadcast protocol to discover the user computing device, or allow the user computing device to discover the delivery computing device.

When the delivery computing device computing device has identified the user computing device or when the user computing device has identified the delivery computing device, the delivery computing device and/or the user computing device can transmit an indication to the remote computing system that the delivery computing device is within a delivery device communication range of the user computing device. In some instances, the delivery device communication range can be based on the transmission power of the delivery device and/or the user computing device. In some instances, the delivery device communication range can be based on a receiving capability of the delivery device and/or the user computing device.

In some instances, the delivery computing device can fail to identify/detect the user computing device and/or the user computing device can fail to identify/detect the delivery computing device. For example, the remote computing device can transmit a detection time threshold to the delivery computing device and/or the user computing device. If an amount of time that the delivery computing device and/or the user computing device takes to identify/detect the other computing device meets or exceeds the detection time threshold, the delivery computing device and/or the user computing device can determine a detection failure. In some instances, the delivery computing device and/or the user computing device can transmit an indication of the detection failure to the remote computing system where the detection failure can be logged. In some instances, the detection time threshold can be based on a user preference, a delivery location, a type of the delivery computing device, a type of the user computing device, a communication protocol, and/or based on a machine-learning algorithm. In some instances, the delivery computing device and/or the user computing device can generate a notification of the detection failure and a courier and/or a user associated with the delivery computing device and/or the user computing device can override the detection failure. For example, a courier can determine that the delivery location is correct despite the detection failure and discard the notification of the detection failure.

The remote computing system can then transmit a package computing device identifier associated with the package computing device to the user computing device. In some instances, the user computing device can transmit a request to the remote computing system for the package computing device identifier. The package computing device identifier can be an identifier such as a universally unique identifier (UUID) that can be used to identify the package computing device, although other types of identifiers are contemplated such as a media access control (MAC) address and/or other generated values/identifiers based on random number generating algorithms (e.g., a pseudorandom number generator) and/or other number generating algorithms.

Once the user computing device receives the package computing device identifier, the user computing device can discover and/or scan for the package computing device identifier. In some instances, the package computing device can continuously broadcast the package computing device identifier. In some instances, the package computing device can be instructed to broadcast the package computing device identifier. For example, the remote computing system and/or the delivery computing device, after determining that the delivery computing device is within the delivery device communication range of the user computing device, can transmit instructions to the package computing device to begin broadcasting the package computing device identifier. In some instances, the package computing device can be configured to begin broadcasting the package computing device identifier based on a time threshold. For purposes of illustration only, the remote computing system can determine that the delivery of the package to the delivery location will take 36 hours and configure the package computing device to begin broadcasting the package computing device identifier at the 35th hour of the 36-hour delivery time. In some instances, the package computing device can include a location sensor (e.g., a GPS sensor) to determine its location and can be configured by the remote computing system to begin broadcasting the package device identifier when it is within the geographic region associated with the delivery location.

As the courier brings the package closer to the delivery location, the package computing device can be brought within a package device communication range of the user computing device. Once the package computing device is within the package device communication range of the user computing device, the user computing device can identify the package computing device identifier and determine that the package has been successfully delivered to the delivery location. For example, the user computing device can compare the package computing device identifier that it received from the remote computing system to the package computing device identifier broadcast by the package computing device to determine that the package computing device is within the package device communication range of the user computing device. Based on determining that the package has been successfully delivered to the delivery location, the user computing device can transmit to the remote computing system verification data that indicates that the successful delivery of the package.

In some instances, the user computing device can fail to identify/detect the package computing device. For example, the remote computing device can transmit a package device detection time threshold to the user computing device. If an amount of time that the user computing device takes to identify/detect the package computing device meets or exceeds the package device detection time threshold, the user computing device can determine a detection failure. In some instances, the user computing device can transmit an indication of the detection failure to the remote computing system and/or the delivery computing device where the detection failure can be logged. In some instances, the package device detection time threshold can be based on a user preference, a delivery location, a type of the package computing device, a type of the user computing device, a communication protocol, and/or based on a machine-learning algorithm. In some instances, the user computing device can generate a notification of the detection failure and a user associated with the user computing device can override the detection failure. For example, a user can determine that a successful delivery of the package despite the detection failure and discard the notification of the detection failure.

The user computing device can determine broadcast attributes such as a signal strength associated with the broadcast of the package computing device identifier to determine the successful delivery of the package. For example, the user computing device can measure the signal strength associated with the broadcast of the package computing device identifier in decibels-milliwatts (dBm), arbitrary strength units (ASU), reference signals received power (RSRP), and/or reference signals received quality (RSRQ). The user computing device can compare the measured signal strength with a signal strength threshold to approximate a distance between the package computing device and the user computing device. For purposes of illustration only, the user computing device can determine that the measured signal strength of the broadcast of the package computing device identifier is −53 dBm and compare the measured signal strength to a signal strength threshold of −64 dBm and determine that the measured signal strength meets or exceeds the signal strength threshold. The user computing device can infer, based on the measured signal strength meeting or exceeding the signal strength threshold, that the package computing device is within an acceptable distance from the user computing device to determine the successful delivery of the package.

The remote computing system can configure the package computing device to broadcast the package computing device identifier based on the occupancy density associated with the delivery location. For purposes of illustration only, the remote computing system can determine that the occupancy density meets or exceeds an occupancy density broadcast threshold and configure the package computing device to broadcast the package computing device identifier at a lower power. This can result in requiring the package computing device to be at a closer distance to the user computing device for the user computing device to determine the successful delivery of the package. In some instances, the remote computing system can transmit to the user computing device the configured broadcast power of the package computing device which can allow the user computing device to adjust the signal strength threshold accordingly.

In some instances, the delivery location can be associated with a camera computing device. The camera computing device can capture image data at, for example, a front door of the delivery location and generate additional verification data indicating the successful delivery of the package. For purposes of illustration only, the remote computing system, the user computing device, and/or the delivery computing device can transmit instructions to the camera computing device to determine a delivery of the package. The camera computing device can use algorithms such as classification, semantic segmentation, instance segmentation, facial recognition, etc. to determine an object such as the package, the courier, and/or the identity of the courier represented in the image data. The camera computing device can transmit to the user computing device and/or the remote computing system an indication that the camera computing device has detected the delivery of the package and the user computing device and/or the remote computing system can use the indication to additionally determine the successful delivery of the package.

The user accounts and data associated with the user accounts (e.g., purchase data, activity data, user account preferences/settings data, etc.) can be anonymized by generating anonymous identifiers corresponding to the user accounts. Specific characteristics of the orders, purchases, user preferences (e.g., delivery preferences) as well as activity, such as the time of the interactions, the categories of items being interacted with, the sources of the items, and the like, can be discarded. Some activity, such as those corresponding to potentially embarrassing or sensitive shopping behavior, can be discarded. Undiscarded data can be packaged into entries that include anonymous identifiers corresponding to the user accounts and the characteristics of the interaction. In some instances, prior to collecting information relating to a user and a user's interaction with items, the user may opt in and/or approve of such collection of data.

The ability to determine the successful delivery of the package presents technical challenges. One challenge, for example, includes correctly identifying the location of the package. As discussed above, GPS data can result in location data errors that can prevent a precise tracking of a location of the package sufficient to determine the successful delivery of the package. For purposes of illustration only, an apartment building can include multiple apartment units where the delivery location for each apartment unit (e.g., the front door) of each apartment unit is separated by 5 meters (or a lesser distance). Moreover, the GPS data may correspond to multiple different units on separate floors, such as a first unit located on a second floor that is directly below a second unit located on a third floor. Using GPS data, it would be difficult to determine the correct delivery location to deliver the package. The location data provided by GPS can also include a location error that prevents an identification of the correct delivery location. Additionally, a GPS signal can degrade when used indoor and/or below a ground surface. For purposes of illustration only, the delivery location can be within a building and/or a subterranean location where a GPS signal cannot penetrate through to the delivery computing device. Therefore, relying on GPS data can, in some instances, provide inaccurate and/or imprecise location data and result in an unsuccessful delivery of a package.

Another technical challenge, for example, is determining the successful delivery of the package when the delivery computing device cannot connect to a network to communicate with the remote computing system. As discussed above, the delivery computing device may not have a cellular/Wi-Fi antenna and/or may be in a location where it cannot connect to a network to connect to the remote computing system due to poor coverage. Without the ability to communicate with the remote computing system, the delivery computing device cannot indicate that it has entered the geographic region associated with the delivery location and trigger the remote computing system to transmit the instructions to the user computing device to initiate the communication protocol.

To address these technological problems, the system described herein can leverage multiple types of connectivity (e.g., RFID, GPS, cellular, Wi-Fi, Bluetooth, etc.) to determine when to initiate the communication protocol and determine the presence of the package computing device to determine a successful delivery of a package.

FIG. 1 is a pictorial flow diagram of an example process 100 for determining that a package computing device is within a communication range of a user computing device. Some portions of example process 100 can be omitted, replaced, and/or reordered while still providing the functionality of determining that the package computing device is within the communication range of the user computing device.

At operation 102, a courier can use a vehicle 104 to deliver a package 106 to a delivery location 108. The courier can use a delivery computing device (also referred to as a delivery device) 110. As discussed above, the courier can use the delivery computing device 110 to provide directions to the delivery location 108. In some instances, the delivery computing device 110 can determine data that includes location data indicating a location of the delivery computing device (using, for example, a GPS sensor, cellular networks, signal strength data, etc.), that the delivery computing device 110 has entered a geographic region, and/or that the delivery computing device 110 is within a range of a different computing device.

The delivery location 108 can be associated with a geographic region (also referred to as a geofence) 114. In some instances, the geographic region 114 can be a region defined by a radius around the delivery location 108. In some instances, the geographic region 114 can be defined by characteristics associating with a surrounding area of the delivery location 108. For example, the delivery location 108 can be adjacent to a different building 116 and the geographic region 114 can be defined as to not overlap with the different building 116.

Using the location data, the delivery computing device 110 can determine that it has entered the geographic region 114. For example, the delivery computing device 110 can compare the location data with map data. In some instances, the map data can be stored on the delivery computing device 110 and/or the map data can be accessible by the delivery computing device 110 via one or more remote computing resources (e.g., one or more servers). In some instances, the delivery computing device 110 can access map data using a wireless network. After the delivery computing device 110 enters the geographic region 114, the delivery computing device can transmit data 118 to the remote computing system 112, which can include an indication that the delivery computing device has entered the geographic region 114.

When the remote computing system 112 receives the indication that the delivery computing device has entered the geographic region 114, the remote computing system can transmit data 118 to the delivery computing device 110 that includes a user computing device identifier associated with a user computing device (also referred to as a user device) 120. In some instances, the user computing device identifier can include an access point name. In some instances, the user computing device identifier can include a UUID, a MAC address, and/or a Bluetooth address of the user computing device 120. In some instances, the user computing device identifier can include a radio-frequency identifier. That is, the user computing device identifier can include any combination of characters (e.g., letters, numbers, symbols, etc.) that uniquely identifies the user computing device 120.

At operation 122, the remote computing system 112 can transmit, to the user computing device 120 that is associated with user 124 and/or the delivery location 108, instruction data 126 that includes instructions for the user computing device 120 to initiate a communication protocol. The communication protocol can include a discovery protocol to detect the delivery computing device 110 and/or a broadcast protocol to enable a discovery of the user computing device 120 by the delivery computing device 110. In some instances, the discovery protocol can include detecting data packets transmitted by delivery computing device 110 and the broadcast protocol can include transmitting data packets from the user computing device 120. The user computing device 120 can have a communication region (also referred to as a broadcast region) 128 that is associated with the user computing device 120, the wireless signal, and/or the communication protocol used by the user computing device 120. For purposes of illustration only, the communication region 128 can be a range of a Wi-Fi controller, an RFID controller, and/or a Bluetooth controller of the user computing device 120.

In some instances, the remote computing system 112 can transmit data 126 to the user computing device 120 that includes a delivery computing device identifier associated with the delivery computing device 110. In some instances, the delivery computing device identifier can include an access point name. In some instances, the delivery computing device identifier can include a radio-frequency identifier, a UUID, a MAC address, or a Bluetooth address of the delivery computing device 110. Then, the delivery computing device 110 can initiate the communication protocol and, similarly, have a communication region 130 that is associated with, for purposes of illustration only, a range of an RFID controller, a Wi-Fi controller and/or a Bluetooth controller of the delivery computing device 110.

The courier can use a delivery person 132 to approach the delivery location 108 with the delivery computing device 110 and a package 134 which can include a package computing device 136. As discussed above, in some instances, the delivery person 132 can be an individual that operates the vehicle 104 where the vehicle 104 can be, for example, a car, a truck, a bicycle, and/or the delivery person 132 can deliver the package on food. In some instances, the delivery person 132 can be an autonomous vehicle and not an individual. For example, the autonomous vehicle can be an autonomous car, an autonomous truck, an autonomous aerial vehicle, a UAV, and/or a robot (e.g., an autonomous robot or a robot controlled by an individual). In some instances, the autonomous vehicle can include the delivery computing device 110. The package 134 can include an item ordered by user 124. The package computing device 136 can be equipped with a battery and a communication module used to determine a proximity of the package computing device 136 with the user computing device 120.

As the delivery person 132 approaches the delivery location 108, the delivery computing device 110 can determine that it has entered a communication region 128 and/or that the communication region 130 associated with the delivery computing device 110 intersects with the communication region 128 associated with the user computing device 120 (the region at which the intersection begins can also be referred to as entering a first range of the user computing device 120).

After the communication region 130 of the delivery computing device 110 intersects with the communication region 128 of the user computing device 120, the delivery computing device 110 can transmit an indication that the delivery computing device 110 has arrived at the delivery location 108. In some instances, the delivery person 132 can drop the package 134 at a drop location such as a front door of the delivery location 108.

At operation 138, the remote computing system 112, after receiving an indication that the delivery computing device 110 has arrived at the delivery location 108, can transmit, to the user computing device 120, data 140 that includes a package computing device identifier associated with the package computing device 136. In some instances, the package computing device identifier can be a UUID, a MAC address, and/or other generated values/identifiers. Using the package computing device identifier, the user computing device 120 can discovery and/or scan for the package computing device 136.

As discussed above, the package computing device 136 can continuously or periodically broadcast the package computing device identifier and/or be instructed to broadcast the package computing device identifier. The package computing device 136 can have a communication region 142. In some instances, the communication region 142 associated with the package computing device 136 can intersect with the communication region 128 associated with the user computing device 120 (the region at which the intersection begins can also be referred to as entering a second range of the user computing device 120). The user computing device 120 can detect the broadcast of the package computing device identifier, compare the detected package computing device identifier with the package computing device identifier received from the remote computing system 112 and verify that the detected package computing device identifier matches with the package computing device identifier received from the remote computing system 112 and determine that the package 134 has been successfully delivered to the delivery location 108.

For purposes of illustration only, an example process of delivering the package 134 can include the courier transporting the package 134 toward the delivery location 108. As the courier approaches the delivery location 108, the delivery computing device 110 that is associated with the courier can determine that the courier has entered a geographic region 114 associated with the delivery location 108. This geographic region 114 may be a geofence that is based on the delivery location and/or the user computing device 120 at the delivery location. The delivery computing device 110 can transmit an indication to remote computing system 112 that the courier has entered the geographic region 114. Then, the remote computing system 112 can transmit instructions to a user computing device 120 to initiate a communication protocol and the remote computing system 112 can transmit, to the delivery computing device 110, a user computing device identifier that is associated with the user computing device 120. In some instances, the user computing device identifier may be already stored by the delivery computing device 110, or the delivery computing device 110 may access the user computing device identifier from a different source.

The communication protocol can include a broadcast protocol and the user computing device 120 can broadcast the user computing device identifier. The delivery computing device 110 can discover and/or scan for the user computing device 120 using the user computing device identifier that the delivery computing device 110 received from the remote computing system 112. The delivery person 132 can bring the delivery computing device 110 and the package 134 toward the delivery location 108 and the communication region 130 of the delivery computing device 110 can intersect with the communication region 128 of the user computing device 120, for example, near a front door of delivery location 108. When the communication region 130 and the communication region 128 intersect, the delivery computing device 110 can detect the user computing device 120 and transmit an indication to the remote computing system 112 that the package 134 has arrived at the delivery location 108. The remote computing system 112 can transmit a package computing device identifier that is associated with the package computing device 136 to the user computing device 120. The user computing device 120 can initiate a discovery protocol for the package computing device 136 using the package computing device identifier within the communication region 128 and the package computing device 136 can broadcast the package computing device identifier within the communication region 142. In some instances, the package computing device 136 can continuously or periodically broadcast the package computing device identifier. When the communication region 128 and the communication region 142 intersect, the user computing device 120 can detect the package computing device 136 and transmit an indication of a verified delivery of the package 134 at the delivery location 108.

Figure 2A:
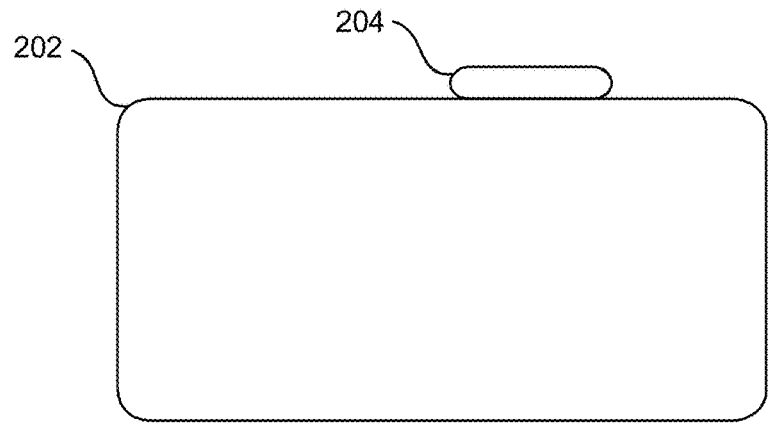
FIG. 2A depicts a plan view of a top of an example package computing device.

FIG. 2A is a plan view 200 of a top of an example package computing device 202. In some instances, the example package computing device 202 can be the similar to the package computing device 136 depicted in FIG. 1. The example package computing device 202 can include a housing that contains internal components of the example package computing device 202. In some instances, the housing can be made of a plastic material although other suitable materials are contemplated such as rubber, metal, paper, etc. The dimensions of the example package computing device 202 can include a width of 40 mm, a height of 20 mm, and a thickness of 3 mm. However, the dimensions are merely exemplary and other suitable dimensions are contemplated. The example package computing device 202 can include an insulating sheet 204 that can insulate, for example, a battery from a positive and/or negative contact within the example package computing device 202. In some instances, the insulating sheet 204 can be a plastic material although other suitable insulating materials are contemplated such as rubber, paper, metal, polyester, polyvinyl chloride, polyethylene terephthalate, etc. In some instances, the thickness of the insulating sheet 204 can include a range of 0.1 mm to 0.3 mm although other thicknesses are contemplated. In some instances, the insulating sheet 204 can reduce a consumption and/or drain of the battery prior to a use of the example package computing device 202.

Figure 2B:
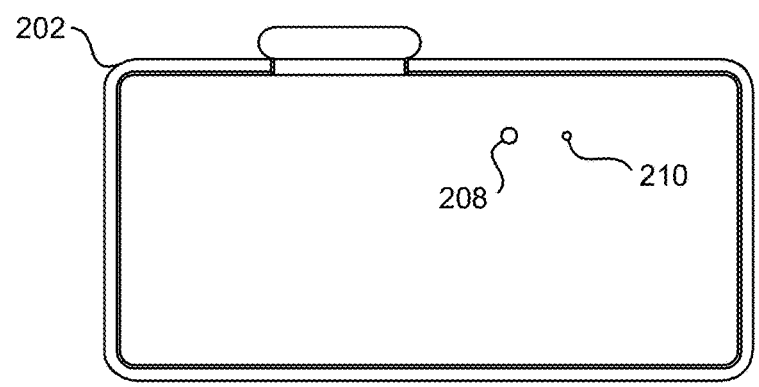
FIG. 2B depicts a plan view of a bottom of the example package computing device of FIG. 2A.

FIG. 2B is a plan view 206 of a bottom of the example package computing device 202. In some instances, the example package computing device 202 can include a first aperture 208 that can allow a user to activate a reset button within the example package computing device 202. In some instances, the example package computing device 202 can include a second aperture 210 that can allow a light emitted from, for example, a light-emitting diode (LED) to emit from the example package computing device 202. In some instances, the LED can indicate a power on status indicating that the package computing device 202 is currently powered on, a power off status indicating that the package computing device 202 is currently powered off, a low power status indicating that the battery of the package computing device 202 is currently low (e.g., below a threshold), a pairing status indicating that the package computing device 202 is wirelessly connected to, or is attempting to connect to, a different device, and/or a communication status using a variety of colors and/or flashing patterns, which may indicate whether the package computing device 202 is currently communicating with, or is currently configured to communicate with, one or more different devices.

Figure 3:
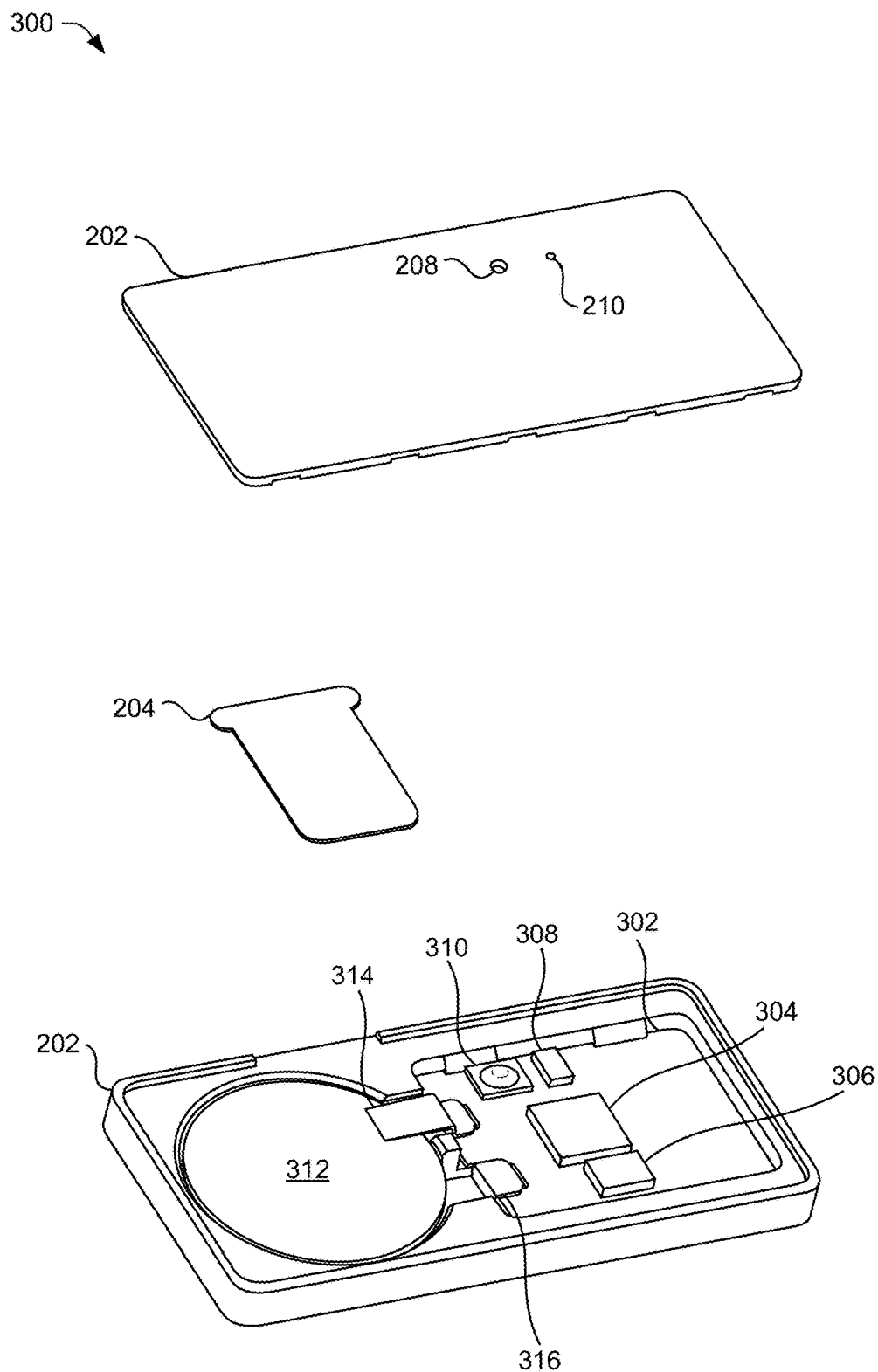
FIG. 3 depicts an exploded diagram of the example package computing device of FIGS. 2A and 2B.

FIG. 3 illustrates an exploded diagram 300 of the example package computing device 202. The example package computing device 202 can include a circuit board 302 that can mechanically support electronic components such as a processor 304 and a memory 306. Additionally, the example package computing device 202 can include an LED 308 which, as discussed above, can emit light that can be visible through the second aperture 210. In some instances, the example package computing device 202 can include a reset button 310 that can be accessed and depressed through the first aperture 208. In some instances, a battery 312 can provide power to the circuit board 302 through a positive terminal 314 and a negative terminal 316. The insulating sheet 204, when placed between the positive terminal 314 and the surface of the battery 312, can insulate the battery 312 from the positive terminal 314 and prevent or reduce an electrical charge passing from the battery 312 to the circuit board 302. In some instances, the package computing device can be powered using solar cells affixed to an exterior portion of the example package computing device 202. In some instances, the package computing device can use mechanically generate power using, for example, linear induction where a motion of the package computing device 202 can generate power as a magnet traverses across a coil.

Figure 4:
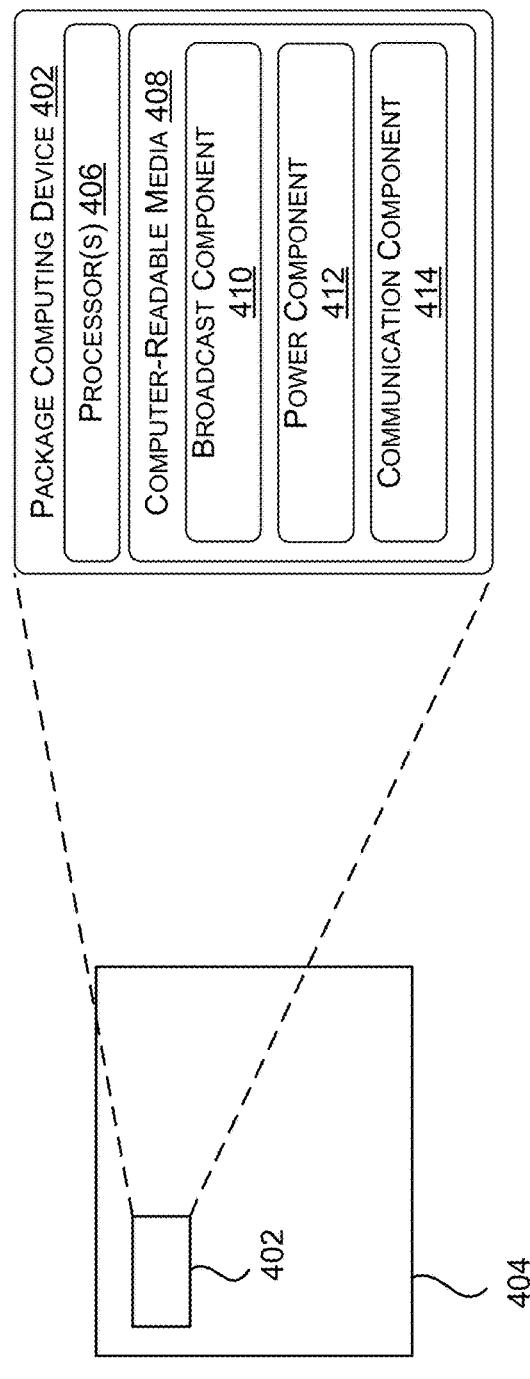
FIG. 4 is a system diagram of an illustrative computing architecture of the package computing device of FIGS. 2A, 2B, and 3.

FIG. 4 is an illustrative computer architecture diagram 400 of a package computing device 402. The package computing device 402 can be similar to the package computing device 136 depicted in FIG. 1 and the example package computing device 202 depicted in FIGS. 2A, 2B, and 3. The package computing device 402 can be attached (e.g., affixed to an exterior) to a package 404, which can be similar to the package 134 depicted in FIG. 1. In some instances, the package computing device 402 can be placed within the package 404.

The package computing device 402 can be implemented in a distributed or non-distributed computing environment. For example, some of the components can be distributed across multiple computing platforms or all of the components can be consolidated onto a single computing platform. Additionally, some of the components can be duplicated and implemented in parallel.

The package computing device 402 can include processor(s) 406 and a computer-readable media 408 that stores various modules, applications, programs, or other data. The processor(s) 406 can be similar to the processor 304 depicted in FIG. 3. In some instances, the processor(s) 406 can include a central processing unit (CPU), a graphics processing unit (GPU), both a CPU and a GPU, or other processing units or components known in the art. Additionally, each of the processor(s) 406 can possess its own local memory, which also may store program modules, program data, and/or one or more operating systems. The computer-readable media 408 can also include instructions, that when executed by the processor(s) 406, cause the processor(s) 406 to perform the operations described herein for the package computing device 402.

The computer-readable media 408 can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. The computer-readable media 408 can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computer-readable media 408 can store a broadcast component 410, a power component 412, and a communication component 414. The broadcast component 410 can enable the package computing device 402 to broadcast the package computing device identifier. As discussed above, the package computing device identifier can be a UUID, a MAC address, a different identifier, and/or a generated value.

The broadcast component 410 can broadcast using RFID, Wi-Fi, and/or Bluetooth, although other wireless communication standards are contemplated, such as cellular-based communications. In some instances, the broadcast component 410 can change the package computing device identifier associated with the package computing device 402. For example, the package computing device 402 can receive the package computing device identifier and change/update the package computing device identifier to the package computing device identifier received from the remote computing system. In some instances, the package computing device 402 can receive an instruction from a remote computing system to change the package computing device identifier and the package computing device 402 can transmit the package computing device identifier to the remote computing system. In some instances, the broadcast component 410 can broadcast metadata associated with the package computing device 402. For example, the metadata can include a broadcast interval and/or a broadcast power that can inform a computing device that receives the broadcast regarding the broadcast interval and/or the broadcast power, although other metadata are contemplated such as additional data related to the package computing device 402, and/or a delivery of a package.

The power component 412 can monitor a power available for use by the package computing device 402. For purposes of illustration only, the power component 412 can determine that the power available in a battery of the package computing device 402 is below a battery power threshold and cause the broadcast component 410 to pause a broadcast of the package computing device identifier and/or cause the broadcast of the package computing device identifier to broadcast intermittently on a broadcast interval. In some instances, the power component 412 can cause the broadcast component 410 to broadcast at a particular power level. For purposes of illustration only, the power component 412 can be configured to indicate to the broadcast component 410 to broadcast at a signal strength of −53 dBm.

In some instances, the package computing device 402 can be configured by a remote computing system to determine the broadcast signal strength. For example, the package 404 can be intended to be delivered to a delivery location that requires a particular broadcast signal strength. For purposes of illustration only, the delivery location can be a location with a high occupancy density and, therefore, the package computing device 402 can be configured to have a predefined broadcast signal strength that is lower in order to reduce the communication region associated with the package computing device 402. The reduced communication region can allow for the package 404 to require a closer delivery to a user computing device at the delivery location and reduce the chances of a delivery at an incorrect delivery location.

The communication component 414 can allow the package computing device 402 to communicate with a remote computing system. For example, at a fulfillment center, the package computing device 402 can be associated with a package 404 and a remote computing system can communicate with the package computing device 402 to configure the broadcast signal strength of the broadcast signal. In some instances, the communication component 414 can use RFID, Wi-Fi, Bluetooth, and/or cellular networks to communicate with the remote computing system. In some instances, the communication component 414 can use wired communications to communicate with the remote computing system. In some instances, the communication component 414 can receive instructions from the remote computing system to broadcast the package computing device identifier at a particular time. For purposes of illustration only, the remote computing system can determine that the delivery of the package 404 can take a certain amount of time and configure the package computing device 402 to begin broadcasting the package computing device identifier at a time before the estimated delivery of the package 404.

The use of the package computing device 402 (e.g., a beacon device) can allow for the package to be detectable by a delivery computing device of a courier that is transporting/delivering the package and/or by a user computing device at the delivery location. Without the use of the package computing device 402, a courier may deliver the package to a delivery location and there may be uncertainty as to whether the package was delivered to the correct delivery location. In some instances, the courier may deliver the package to an incorrect delivery location and the courier would not have a mechanism of determining whether the delivery location is correct or incorrect. Instead, the package computing device 402 can communicate with a user computing device that is located at the delivery location and the user computing device and/or the delivery computing device can confirm the successful delivery of the package 404 at the delivery location.

Figure 5:
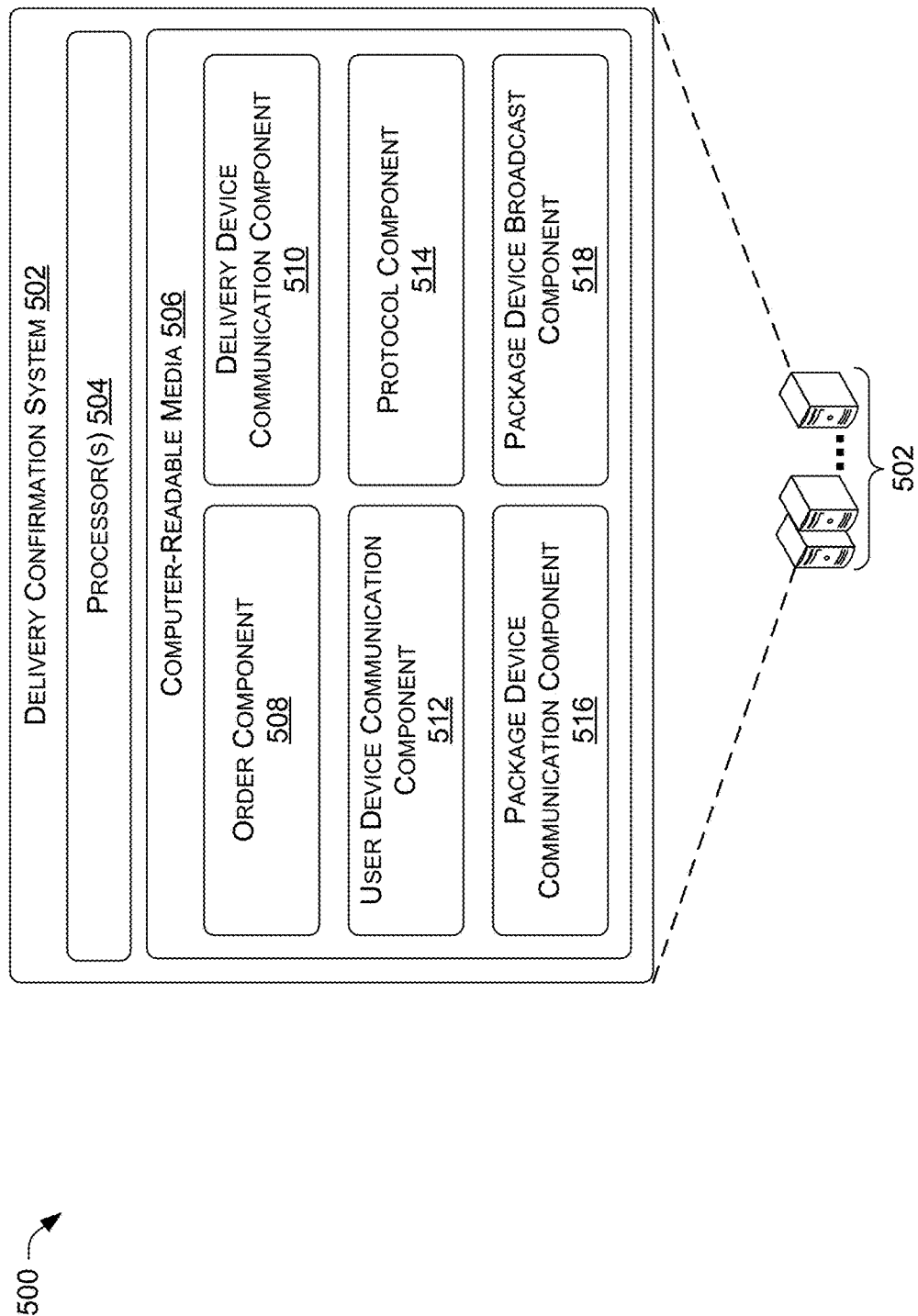
FIG. 5 is a system diagram of an illustrative computing architecture of a delivery confirmation system.

FIG. 5 is an illustrative computer architecture 500 of a delivery confirmation system (also referred to as a remote computing system) 502. The delivery confirmation system 502 can be similar to the remote computing system 112 depicted in FIG. 1.

The delivery confirmation system 502 can be implemented in a distributed or non-distributed computing environment. For example, some of the components can be distributed across multiple computing platforms or all of the components can be consolidated onto a single computing platform. Additionally, some of the components can be duplicated and implemented in parallel.

The delivery confirmation system 502 can include processor(s) 504 and a computer-readable media 506 that stores various modules, applications, programs, or other data. In some instances, the processor(s) 504 can include a central processing unit (CPU), a graphics processing unit (GPU), both a CPU and a GPU, or other processing units or components known in the art. Additionally, each of the processor(s) 506 can possess its own local memory, which also may store program modules, program data, and/or one or more operating systems. The computer-readable media 506 can also include instructions, that when executed by the processor(s) 504, cause the processor(s) 504 to perform the operations described herein for the delivery confirmation system 502.

The computer-readable media 506 can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. The computer-readable media 506 can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computer-readable media 506 can store a order component 508, a delivery device communication component 510, a user device communication component 512, a protocol component 514, a package device communication component 516, and a package device broadcast component 518.

The order component 508 can determine that a user has ordered and/or purchased an item that is to be delivered to a delivery location of the user (e.g., a residence, a workplace, etc.). In some instances, the order component 508 can determine order data (and/or purchase data) that can indicate, for example, the item ordered/purchased, a cost of the time, the delivery location, and/or a delivery preference associated with the order/purchase and/or the user. The order component 508 can determine to use a package computing device based on the order data. For example, the order data can indicate that the user ordered the item and selected a preference to use the package computing device. In some instances, the user can have a default preference that indicates the preference to use the package computing device. The order component 508 can, based on the preference, associate a package computing device with a package of the item. The order component 508 may store an association between the package computing device and the package/item in a database or datastore maintained by, associated with, or otherwise accessible by the delivery confirmation system 502.

The order component 508 can determine to use the package computing device based on, for example, a cost of the item. For example, the order component 508 can compare the cost of the item to an item cost threshold and when the cost of the item meets or exceeds the item cost threshold, the order component 508 can determine to use the package computing device with the package of the item. Since the item included within the package has a relatively high price or cost, the delivery confirmation system 502 and/or the user may desire to confirm that the package is actually delivered to the appropriate delivery location. Otherwise, the courier may be unable delivery the package to the delivery location based on an inability to locate the delivery location, the package may be delivered to an incorrect delivery location, and/or even if the package is successfully delivered, the package may be improperly taken by a different user (e.g., theft of the package).

The order component 508 can determine to use the package computing device based on, for example, an occupancy density associated with the delivery location. For example, the order component 508 can determine an occupancy density associated with the delivery location by using map data and/or user data. The map data can indicate a number of potential delivery locations that are near the delivery location and the user data can indicate a number of potential customers that are near the delivery location. Based on the number of potential delivery locations and/or the number of potential customers that are near the delivery location, the order component 508 can determine an occupancy density associated with the delivery location and compare the occupancy density with an occupancy density threshold. If the occupancy density meets or exceeds the occupancy density threshold, the order component 508 can determine to use the package computing device with the package of the item. For instance, it may be determined that the delivery location is an apartment that is located within an apartment building having a large number of units. Using the package computing device may increase the likelihood that the package is successfully delivered at the delivery location and/or may assist the courier in identifying the delivery location for delivery of the package.

In some instances, the order component 508 can access user data associated with the user to determine if the user is associated with a user computing device that is compatible with the use of the package computing device. For example, the order component 508 can access a database that stores a list of computing devices associated with the user. In some instances, the list of computing devices can indicate whether a computing device that is capable of communicating with the package computing device is located and/or associated with the delivery location indicated by the order data.

In some instances, the order component 508 can, based on the order data, transmit an indication of the availability of the use of a package computing device. For example, the user can order an item and the order component 508 can receive the order data associated with the order. Then the order component 508 can determine that, based on the user data, that the delivery location is associated with a compatible computing device that can communicate with the package computing device. The order component 508 can transmit an indication (e.g., an e-mail, a text message, a phone call, a text-based notification on a computing device, an audio-based notification on a computing device, etc.) to a computing device associated with the user that the user can optionally add the feature to use a package computing device with the package of the ordered item for delivery confirmation of the package.

The delivery device communication component 510 can be used to communicate with the delivery computing device used by a courier that will deliver the package to the delivery location. For example, the delivery device communication component 510 can use types of wireless communications such as RFID, Wi-Fi, Bluetooth, and/or cellular data connections to communicate with the delivery computing device. When the delivery computing device enters a geographic region associated with the delivery location, the delivery computing device can provide an indication to the delivery device communication component 510 that the delivery computing device has entered the geographic region.

The user device communication component 512 can be used to communicate with the user computing device that is at the delivery location. For example, after the delivery device communication component 510 receives the indication that the delivery computing device has entered the geographic region, the user device communication component 512 can transmit, to the user computing device, instruction data that indicates the user computing device to initiate a communication protocol. For example, the communication protocol can initiate a discovery protocol and/or a broadcast protocol of the user computing device. Therefore, the communication protocol can enable the user computing device to discovery and/or scan for the delivery computing device and/or allow the delivery computing device to discovery and/or scan for the user computing device.

The protocol component 514 can determine the type of communication protocol to be used by the user computing device. For example, the protocol component 514 can determine to transmit instructions to initiate a discovery protocol or a broadcast protocol. Additionally, the protocol component 514 can determine to transmit the instructions to the user computing device and/or the delivery computing device. As discussed above, the delivery computing device and/or the user computing device can initiate the communication protocol where the communication protocol can include the discovery protocol and/or the broadcast protocol. The protocol component 514 can determine the capabilities of the delivery computing device and the user computing device to determine the communication protocol. For purposes of illustration only, the protocol component 514 can determine to use Wi-Fi access points as a portion of the communication protocol and that the user computing device cannot create a Wi-Fi access point. Then the protocol component 514 can use the delivery device communication component 510 to transmit instructions to the delivery computing device to create a Wi-Fi access point using an access point name and use the user device communication component 512 to transmit instructions to the user computing device indicating the access point name and to discovery and/or scan for the Wi-Fi access point using the access point name.

The package device communication component 516 can communicate with the package computing device. For example, the package device communication component 516 can transmit to the package computing device the package computing device identifier. In some instances, the package computing device can be preconfigured with the package computing device identifier.

The package device broadcast component 518 can determine when the package computing device should initiate a broadcast of the package computing device identifier and transmit instructions using the package device communication component to transmit the instructions to the package computing device. For example, the delivery confirmation system 502 can determine that the delivery computing device and the user computing device are within a communication range associated with the delivery computing device and/or the user computing device. Based on devices being within a communication range, the package device broadcast component can determine instructions and the package device communication component 516 can transmit the instructions to the package computing device to initiate a broadcast of the package computing device identifier. As discussed above, in some instances, the package computing device can continuously broadcast the package computing device identifier and/or broadcast the package computing device identifier intermittingly.

Figure 6:
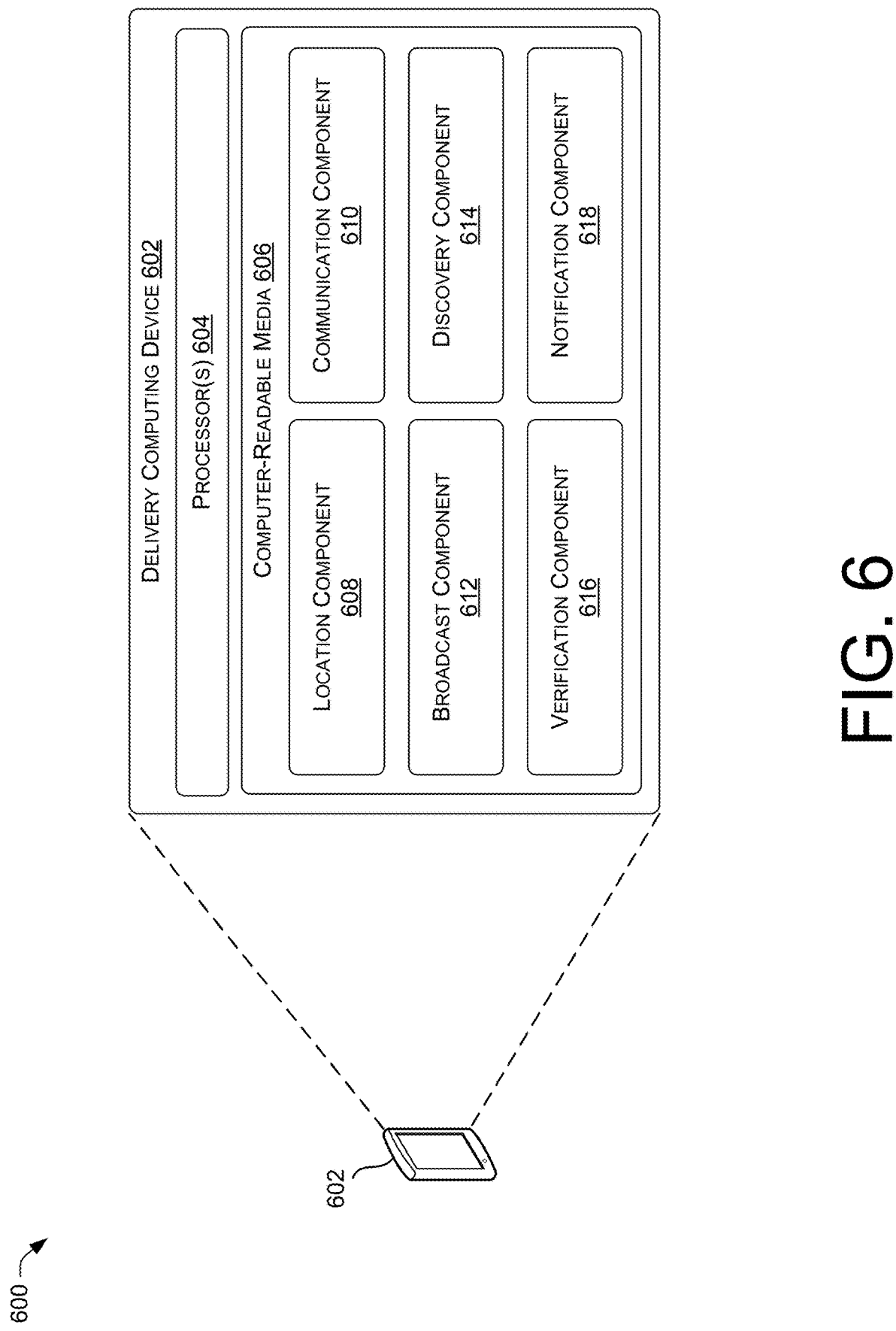
FIG. 6 is a system diagram of an illustrative computing architecture of a delivery computing device.

FIG. 6 is an illustrative computer architecture 600 of a delivery computing device (also referred to as a delivery device) 602. The delivery computing device 602 can be similar to the delivery computing device 110 depicted in FIG. 1.

The delivery computing device 602 can be implemented in a distributed or non-distributed computing environment. For example, some of the components can be distributed across multiple computing platforms or all of the components can be consolidated onto a single computing platform. Additionally, some of the components can be duplicated and implemented in parallel.

The delivery computing device 602 can include processor(s) 604 and a computer-readable media 606 that stores various modules, applications, programs, or other data. In some instances, the processor(s) 604 can be similar to processor(s) 504 and the computer-readable media 606 can be similar to the computer-readable media 506 depicted in FIG. 5. While depicted as a mobile device similar to a cellphone, the delivery computing device 602 can, in some instances, be a tablet computer, a laptop computer, a smartwatch, and/or a different wearable device.

The computer-readable media 606 can store a location component 608, a communication component 610, a broadcast component 612, a discovery component 614, a verification component 616, and a notification component 618. In some embodiments, the communication component 610, the broadcast component 612, and/or the discovery component 614 can be one and the same component.

The location component 608 can be used to determine a location associated with the delivery computing device. For example, the location component 608 can determine a location of the delivery computing device from location data of a GPS receiver although other types of systems are contemplated for determining the location data such as cellular network data and/or triangulation of cellular network connectivity.

The location component 608 can also determine that the delivery computing device 602 is within a geographic region associated with the delivery location. In some instances, the location component 608 can store map data and compare a current location of the delivery computing device 602 with the map data and determine that the delivery computing device is within the geographic region associated with the delivery location. In some instances, the location component can access map data using the communication component 610 from a remote computing device.

As discussed above, the communication component 610 can allow the delivery computing device 602 to access map data from a remote computing device. After determining that the delivery computing device 602 is within the geographic region, the communication component 610 can allow the delivery computing system 502 to indicate to a remote computing device that the delivery computing device 602 is within the geographic region associated with the delivery location based on the map data. The communication component 610 can receive, from the remote computing device, user computing device identifier from the remote computing device. In some instances, the user computing device identifier can be a radio-frequency identifier, a UUID, a MAC address, a Bluetooth address, and/or an access point name associated with the user computing device. In some instances, the communication component 610 can receive instructions from the remote computing device to initiate a communication protocol.

Based on the communication protocol received from the remote computing device, the broadcast component 612 can initiate a broadcast protocol. In some instances, the broadcast protocol can include generating a Wi-Fi access point using an access point name indicated by the communication protocol. In some instances, the broadcast protocol can include broadcasting a device computing device identifier using a wireless communication standard such as Bluetooth and/or RFID.

In some instances, and based on the communication protocol received from the remote computing device, the discovery component 614 can initiate a discovery protocol. In some instances, the discovery protocol can include scanning for a user computing device identifier indicated by the communication protocol.

After initiating the communication protocol, the discovery component 614 can determine that the delivery computing device 602 is within a communication range of the user computing device by detecting the user computing device via the communication protocol. For example, the discovery component 614 can detect device identifiers of nearby computing devices and compare the device identifiers with the user computing device identifier received from the remote computing device. When the discovery identifies a match, the discovery component 614 can determine that the delivery computing device 602 is within the communication range of the user computing device.

The verification component 616 can receive verification data from the user computing device that the user computing device has detected the package computing device. For example, after determining that the delivery computing device 602 is within the communication range of the user computing device, the user computing device can detect the package computing device and verify that the package has been successfully delivered to the delivery location. In some instances, after the user computing device verifies the successful delivery, the user computing device can transmit an indication to the verification component 616 regarding the successful delivery. This can allow a courier to recognize the delivery confirmation and proceed to, for example, a different delivery.

The notification component 618 can generate a notification of the delivery of the package to the delivery location. For example, the courier can deliver the package to the delivery location and the notification component 618 can generate a notification and use the communication component 610 to transmit the notification to the user computing device and/or the package computing device which can allow the user computing device and/or the package computing device to detect one another. In some instances, the notification component 618 can generate a notification of the delivery and transmit, using the communication component 610, to a remote computing device. This can allow for the remote computing device to record and track the delivery from the delivery computing device 602. In some instances, the notification component 618 can generate a notification of a successful delivery (e.g., a verified delivery) after receiving the verification from the verification component 616. Then, the communication component 610 can transmit the notification of the successful delivery to a computing device associated with the user (e.g., a laptop computer, a tablet computer, a cellphone, a smart speaker, a wearable device, etc.). The notification sent to the computing device of the user can include a variety of information, such as an identity of the ordered item within the package, an identity of the package, a time of delivery, etc. Upon delivery, the user may dispose of the packaging computing device, can return the package computing device via mail, can return the package computing device at a specified drop-off location, and/or can leave the package computing device at the delivery location for subsequent pick-up.

Figure 7:
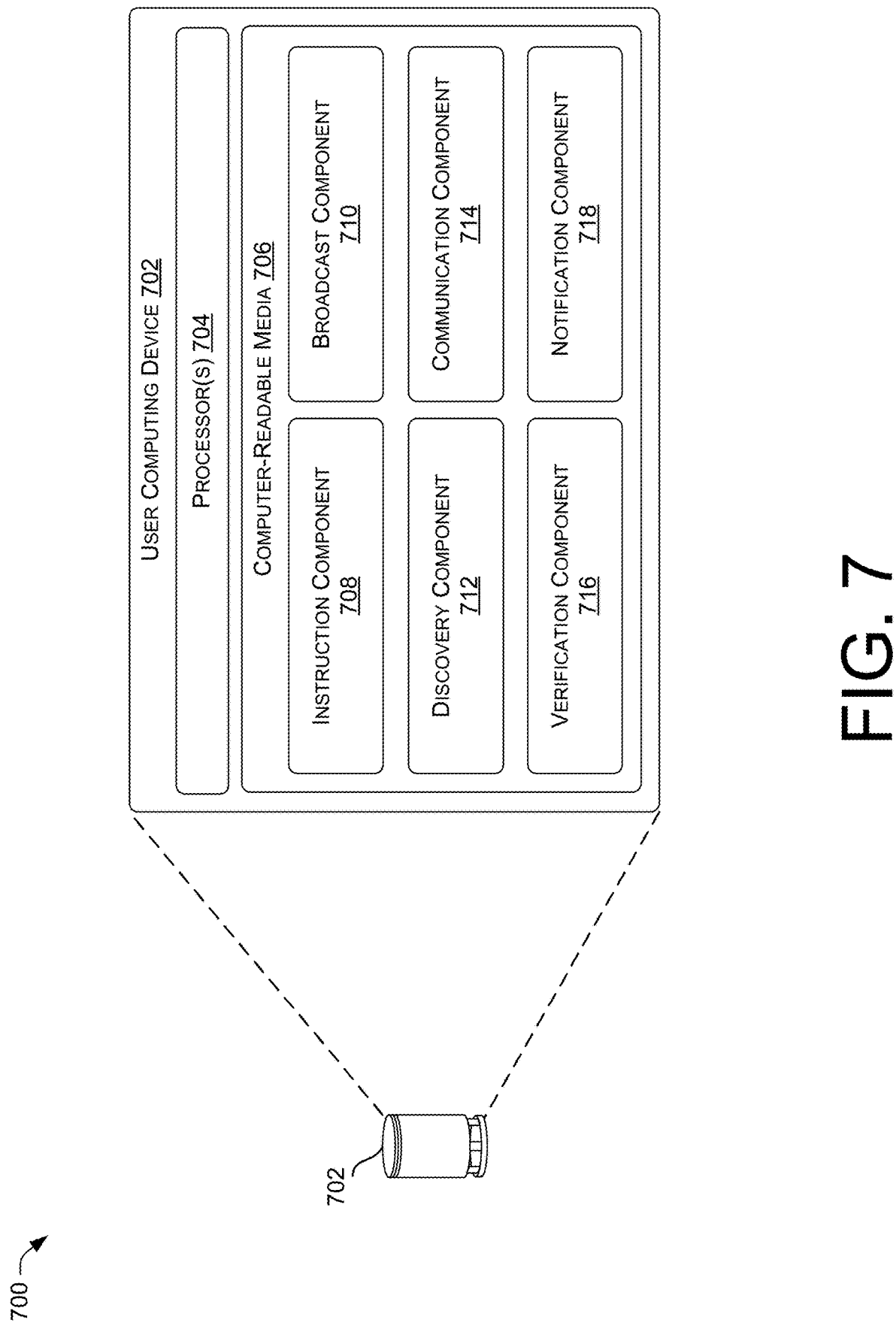
FIG. 7 is a system diagram of an illustrative computing architecture of a user computing device.

FIG. 7 is an illustrative computer architecture 700 of a user computing device (also referred to as a user device) 702. The user computing device 702 can be similar to the user computing device 120 depicted in FIG. 1.

The user computing device 702 can be implemented in a distributed or non-distributed computing environment. For example, some of the components can be distributed across multiple computing platforms or all of the components can be consolidated onto a single computing platform. Additionally, some of the components can be duplicated and implemented in parallel.

The user computing device 702 can include processor(s) 704 and a computer-readable media 706 that stores various modules, applications, programs, or other data. In some instances, the processor(s) 704 can be similar to processor(s) 504 and the computer-readable media 706 can be similar to the computer-readable media 506 depicted in FIG. 5 and the computer-readable media 606 depicted in FIG. 6. While depicted as a smart speaker device, the user computing device 702 can, in some instances, be a tablet computer, a laptop computer, a different wearable device, and/or an Internet of things device such as a smart refrigerator, a smart thermostat, etc. The user computing device 702 can be a voice-controlled device that includes one or more microphones to capture voice commands. The user computing device 702 and/or a remote computing device may process an audio signal corresponding to the voice command to identify one or more words of the voice command and a corresponding intent, such as by using speech recognition techniques (e.g., automatic speech recognition (ASR)) and/or natural language processing (NLP) techniques (e.g., natural language understanding (NLU)). The user computing device 702 may include one or more speakers to audibly output a response to the user or may include one or more displays that visually output the response.

The computer-readable media 706 can store an instruction component 708, a broadcast component 710, a discovery component 712, a communication component 714, a verification component 716, and a notification component 718. In some embodiments, the broadcast component 710, the discovery component 712, and/or the communication component 714 can be one and the same component.

The instruction component 708 can communicate with a remote computing device to receive instructions from a remote computing device to initiate a communication protocol. As discussed above, the communication protocol can be a discovery protocol and/or a broadcast protocol.

The broadcast component 710 can initiate the broadcast protocol and broadcast the user computing device identifier associated with the user computing device 702. The broadcast component 710 can be similar to the broadcast component 612 depicted in FIG. 6.

The discovery component 712 can initiate the discovery protocol and discovery and/or scan for the delivery computing device identifier associated with the delivery computing device. The discovery component 712 can be similar to the discovery component 614 depicted in FIG. 6.

After initiating the communication protocol, the discovery component 712 can determine that the user computing device 702 is within a communication range of the delivery computing device by detecting the delivery computing device via the communication protocol. For example, the discovery component 712 can detect device identifiers of nearby computing devices and compare the device identifiers with the delivery computing device identifier received from the remote computing device. When the discovery identifies a match, the discovery component 712 can determine that the user computing device 702 is within the communication range of the delivery computing device.

Once the discovery component 712 determines that the user computing device 702 is within the communication range of the delivery computing device, the communication component 714 can request the package computing device identifier from the remote computing device. In some instances, the delivery computing device can indicate to the remote computing device that the user computing device 702 is within the communication range of the delivery computing device and the remote computing device can transmit to the communication component 714 the package computing device identifier.

The discovery component 712 can execute a similar discovery protocol and discovery and/or scan for the package computing device identifier. When the discovery component 712 determines that the package computing device identifier is within a communication range of the user computing device 702, the verification component 716 can generate verification data indicating a successful delivery of the package. In some instances, the verification component 716 can determine a signal strength associated a broadcast of the package computing device identifier. The verification component 716 can compare the signal strength to a signal strength threshold to determine whether an estimated distance of the package computing device, based on the signal strength, is close enough to determine a successful delivery. In some instances, the delivery location can be associated with a camera computing device. For purposes of illustration only, the camera computing device can capture image data at a front door of the delivery location and use algorithms such as classification, semantic segmentation, instance segmentation, facial recognition, etc. to determine that the package has been delivered to the delivery location. For instance, it may be determined that images and/or video captured by the camera computing device may depict the package. The camera computing device can transmit this determination to the verification component 716 which can then generate additional verification data indicating the successful delivery of the package.

The notification component 718 can generate a notification of the delivery of the package to the delivery location. For example, the courier can deliver the package to the delivery location, the verification component 716 can determine and verify the successful delivery of the package, and the notification component 718 can generate a notification and use the communication component 714 to transmit the notification to a remote computing device. This can allow for the remote computing device to record and track the delivery of the delivery computing device. In some instances, the notification component 718 can generate a notification of a successful delivery (e.g., a verified delivery) after receiving the verification from the verification component 716 and then, the communication component 714 can transmit the notification of the successful delivery to a computing device associated with the user (e.g., a laptop computer, a tablet computer, a cellphone, a smart speaker, a wearable device, etc.).

Figure 8:
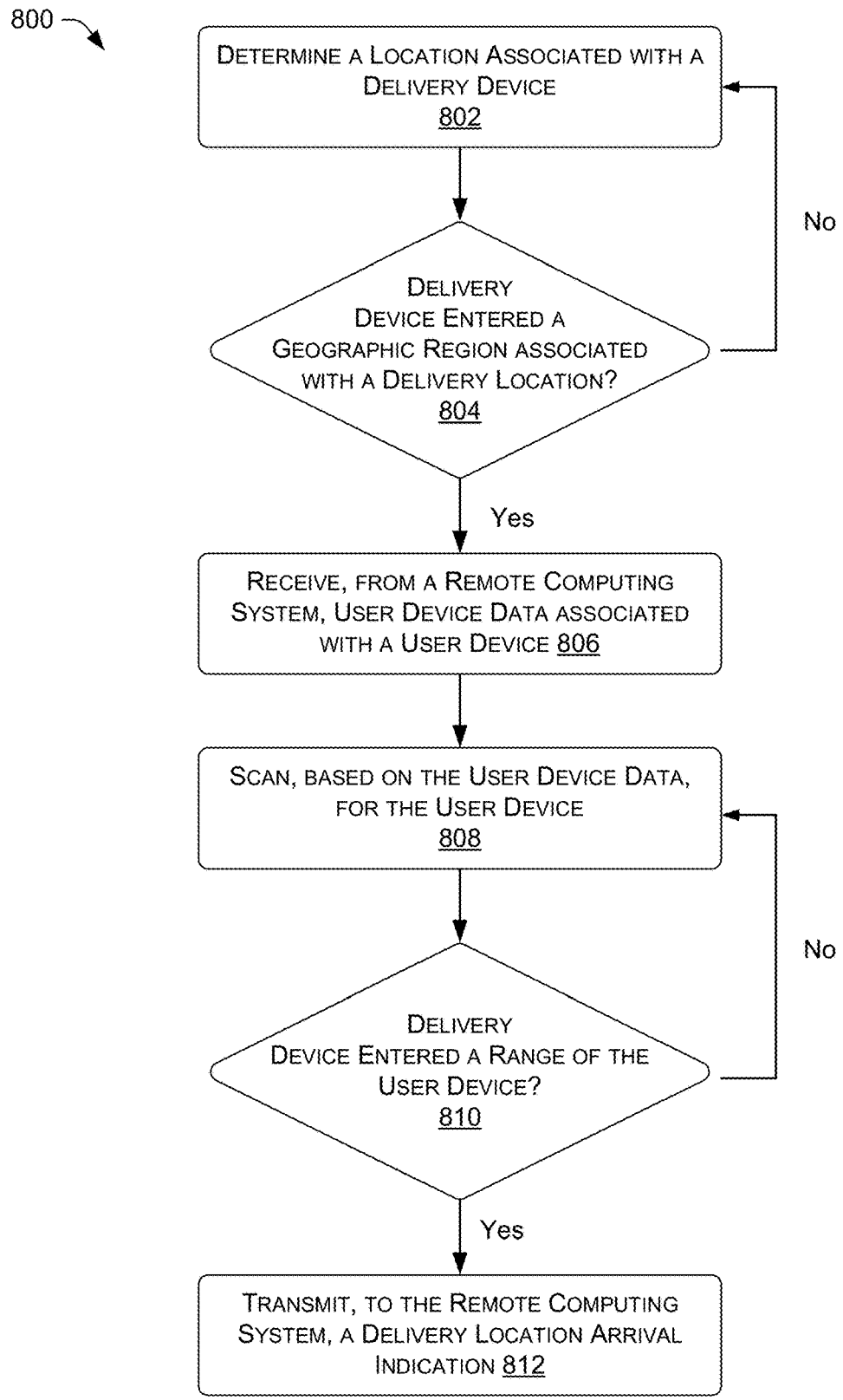
FIG. 8 is a flow diagram of an example process for transmitting, from a delivery device, an indication of a delivery location arrival.

FIG. 8 is a flow diagram of an example process 800 for transmitting, to a remote computing device, a delivery location arrival indication. The example process 800 is described with reference to the computer architecture 600 of FIG. 6. The example process 800 can be performed in other similar and/or different environments. Additionally, some portions of example process 800 can be omitted, replaced, and/or reordered while still providing the functionality of transmitting, to the remote computing device, the delivery location arrival indication.

At operation 802, the delivery computing device 602 can use the location component 608 to determine a location associated with the delivery device (also referred to as the delivery computing device). In some instances, the location component 608 can use GPS data from a GPS receiver to determine the location of the delivery computing device 602. In some instances, the location component 608 can use cellular network data and/or other sensor data to determine the location of the delivery computing device 602.

At operation 804, the location component 608 of the delivery computing device 602 can perform a check to determine if the delivery computing device 602 has entered a geographic region associated with a delivery location. The geographic region can be, for example, a region defined by a radius around the delivery location. The location component 608 can access map data and use the location of the delivery computing device 602 and the map data to determine if the delivery computing device 602 has entered the geographic region. If the delivery computing device 602 has not entered the geographic region, then the example process 800 can return to operation 802. If the delivery computing device 602 has entered the geographic region, then the example process 800 can proceed to operation 806.

At operation 806, the delivery computing device 602 can receive, from a remote computing device, user device data associated with a user device (also referred to as the user computing device). In some instances, the user device data can be a user computing device identifier such as a radio-frequency identifier, a UUID, a MAC address and/or a Bluetooth address of the user computing device.

At operation 808, the delivery computing device 602 can discovery and/or scan, using the discovery component 614 and based on the user device data, for the user computing device.

At operation 810, the discovery component 614 can perform a check to determine if the delivery computing device 602 has entered a range (also referred to as a communication range) of the user computing device. If the discovery component 614 has determined that the delivery computing device 602 has not entered a communication range of the user computing device, then the example process 800 can return to operation 808. If the discovery component 614 has determined that the delivery computing device 602 has entered a communication range of the user computing device, then the example process 800 can proceed to operation 812.

At operation 812, the delivery computing device 602 can transmit, to the remote computing system, a delivery location arrival indication. In some instances, the delivery location arrival indication can indicate that the delivery computing device 602 has entered a communication range of the user computing device.

Figure 9:
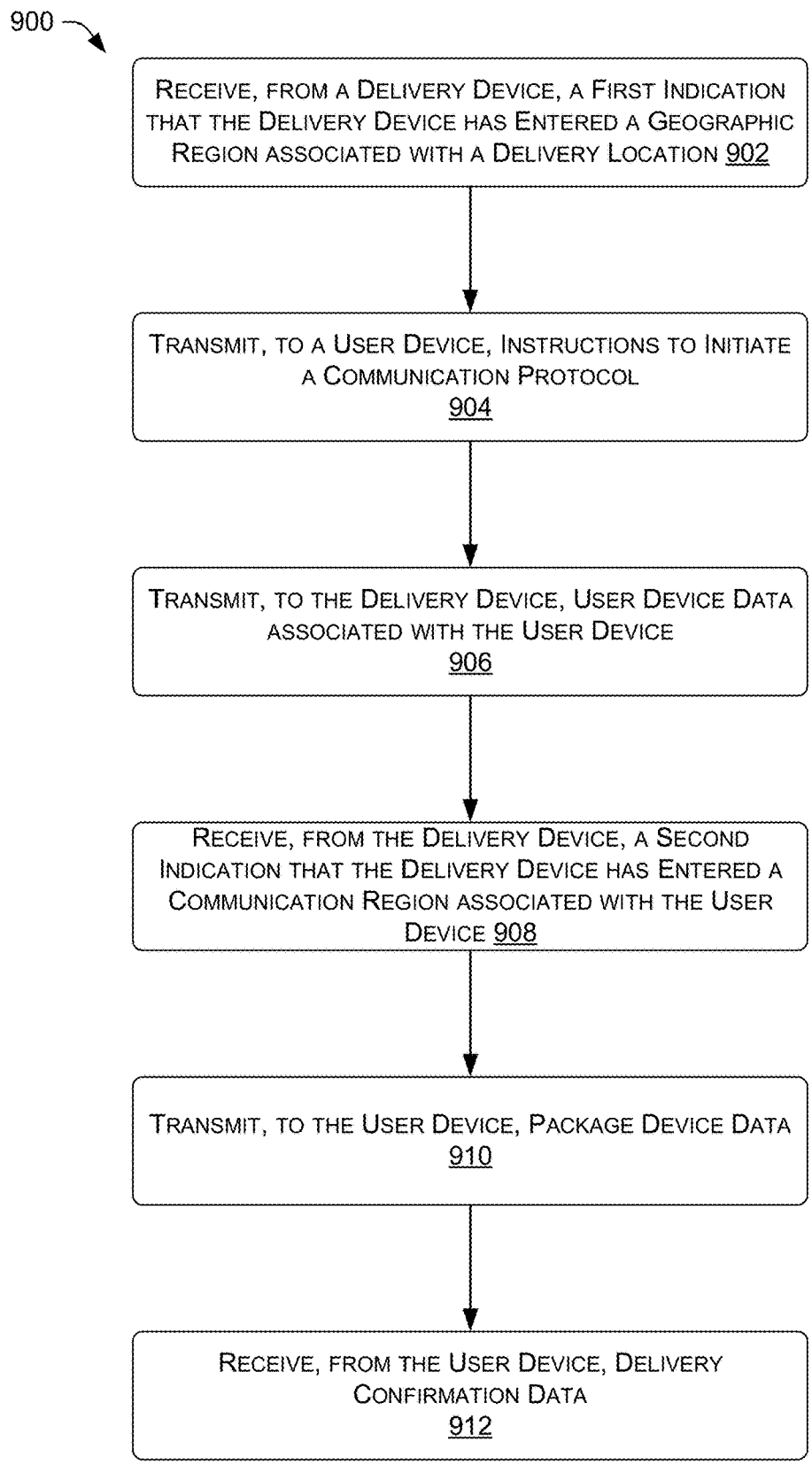
FIG. 9 is a flow diagram of an example process for receiving delivery confirmation data from a user device.

FIG. 9 is a flow diagram of an example process 900 for receiving, from a user device (also referred to as a user computing device) delivery confirmation data. The example process 900 is described with reference to the illustrative computer architecture 500 of FIG. 5. The example process 900 can be performed in other similar and/or different environments. Additionally, some portions of example process 900 can be omitted, replaced, and/or reordered while still providing the functionality of transmitting, to the remote computing device, the delivery location arrival indication.

At operation 902, the delivery confirmation system (also referred to as the remote computing system) 502 can receive, from a delivery device (also referred to as the delivery computing device) a first indication that the delivery computing device has entered a geographic region associated with a delivery location. The delivery confirmation system 502 can receive the first indication using the delivery device communication component 510.

At operation 904, the delivery confirmation system 502 can transmit, to a user computing device, instructions to initiate a communication protocol. As discussed above, the communication protocol can include a discovery protocol and/or a broadcast protocol. In some instances, the delivery confirmation system 502 can use the user device communication component 512.

At operation 906, the delivery confirmation system 502 can transmit, to the delivery computing device and using the delivery device communication component 510, user device data associated with the user computing device. The user device data can be a user computing device identifier which can allow the delivery computing device to uniquely identify the user computing device.

At operation 908, the delivery confirmation system 502 can receive, from the delivery computing device, a second indication that the delivery computing device has entered a communication region associated with the user computing device.

At operation 910, the delivery confirmation system 502, using the user device communication component 512, transmit, to the user computing device, package device data. In some instances, the package device data can be a UUID, a radio-frequency identifier, a MAC address, and/or a Bluetooth address associated with the package computing device.

At operation 912, the delivery confirmation system 502 can receive, from the user computing device, delivery confirmation data. In some instances, the delivery confirmation data can indicate that the user computing device verified that the package had been delivered to the delivery location based on a communication between the user computing device and the package computing device.

Figure 10:
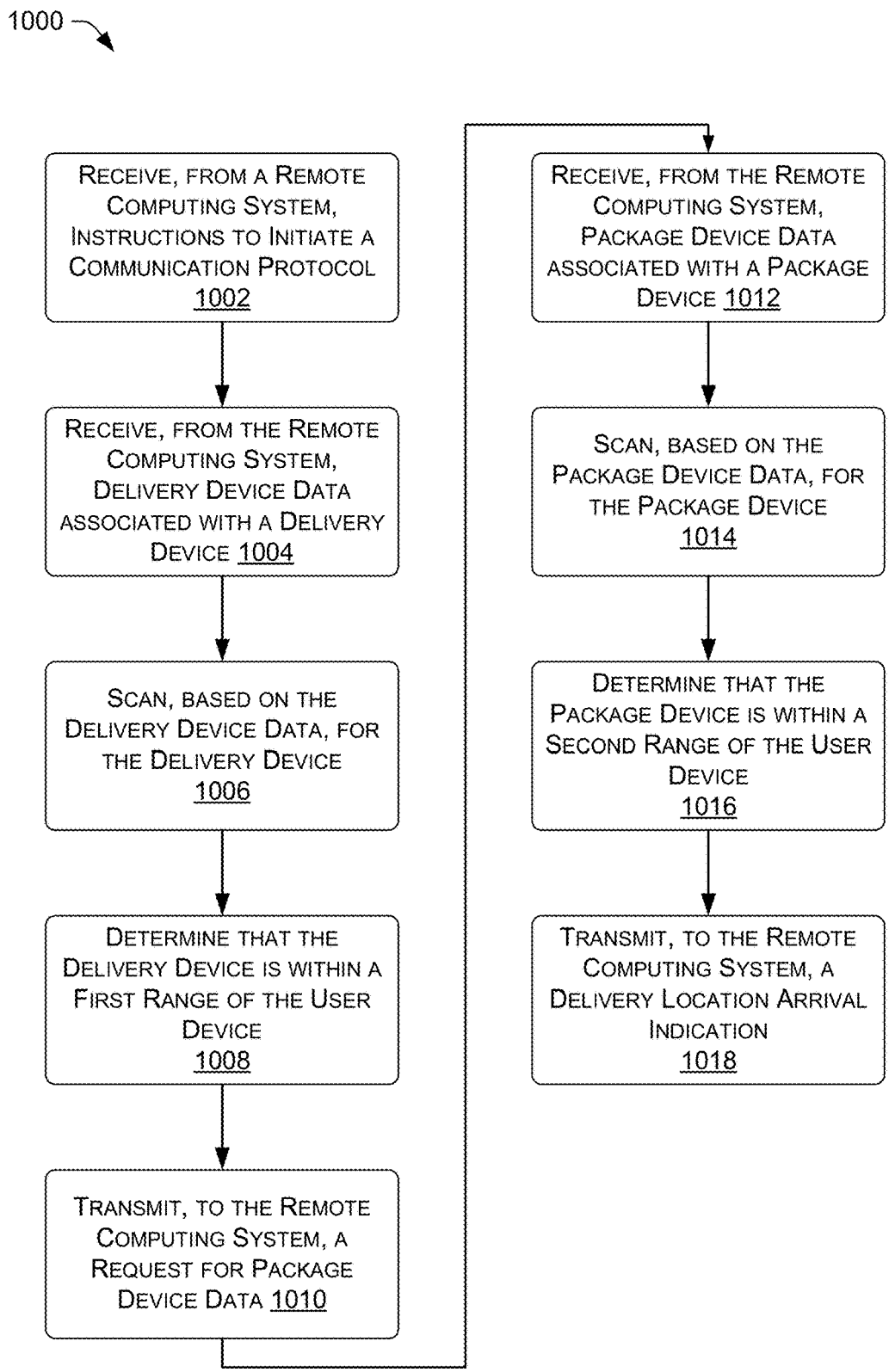
FIG. 10 is a flow diagram of an example process for transmitting, from a user device, an indication of a delivery location arrival

FIG. 10 is a flow diagram of an example process 1000 for transmitting, to a remote computing system, a delivery location arrival indication. The example process 1000 is described with reference to the illustrative computer architecture 700 of FIG. 7. The example process 1000 can be performed in other similar and/or different environments. Additionally, some portions of example process 1000 can be omitted, replaced, and/or reordered while still providing the functionality of transmitting, to the remote computing device, the delivery location arrival indication.

At operation 1002, the user computing device 702 can receive, from a remote computing system, instructions to initiate a communication protocol. In some instances, the communication protocol can be a discovery protocol. In some instances, the communication protocol can be a broadcast protocol.

At operation 1004, the user computing device 702 can receive, from the remote computing system, delivery device data associated with a delivery device (also referred to as the delivery computing device). In some instances, the delivery device data can be a delivery computing device identifier such as a radio-frequency identifier, a UUID, a MAC address and/or a Bluetooth address.

At operation 1006, the user computing device 702 can discovery and/or scan, based on the delivery device data, for the delivery computing device. The discovery component 712 can perform the discovery function to detect the delivery computing device.

At operation 1008, the user computing device 702 can determine that the delivery device is within a first range (or a first communication range) of the user computing device.

At operation 1010, the user computing device 702 can transmit, to the remote computing system, a request for the package device data. The package device data can be a package computing device identifier such as a UUID, a radio-frequency identifier, a MAC address, and/or a Bluetooth address. The user computing device 702 can transmit the request based on determining that the delivery computing device is within a communication range of the user computing device.

At operation 1012, the user computing device 702 can receive, from the remote computing device, package device data associated with a package device (also referred to as the package computing device). In some instances, the package device data can be a package computing device identifier such as a UUID, a radio-frequency identifier, a MAC address, and/or a Bluetooth address.

At operation 1014, the user computing device 702 can discovery and/or scan, based on the package device data, for the package computing device. In some instances, the discovery component 712 can perform the discovery function to detect the package computing device.

At operation 1016, the user computing device 702 can determine that the package computing device is within a second range of the user computing device.

At operation 1018, the user computing device 702 can transmit, to the remote computing device, a delivery location arrival indication. The discovery component 712 can, in some instances, measure a signal strength of a broadcast of the package computing device to determine the delivery location arrival indication.

An example process for confirming a delivery of a package can include a delivery computing device entering a geographic region associated with a delivery location. The delivery computing device can transmit an indication to a remote computing system that the delivery computing device has entered the geographic region. The remote computing system can transmit instructions to a user computing device to enable, for example, Bluetooth discoverability. The remote computing system can transmit a user computing device identifier to the delivery computing device.

The delivery computing device can then initiate a discovery protocol to search for the user computing device and verify that the user computing device is in a proximity of the delivery computing device. The delivery computing device can transmit an indication that the user computing device is in the proximity of the delivery computing device to the remote computing system. The remote computing system can then transmit a package computing device identifier to the user computing device. The user computing device can initiate a discovery protocol to search for the package computing device and verify that the package computing device is in the proximity of the user computing device with a sufficient signal strength. Then the user computing device can transmit an indication of a successful delivery to the remote computing system.

Another example process for confirming a delivery of a package can include a remote computing system instructing a user computing device to discovery and/or scan for a delivery computing device. The delivery computing device can enable, for example, Bluetooth discoverability when as it approaches the delivery location. The user computing device can verify that the delivery computing device is in a proximity to the user computing device and request a package computing device identifier from the remote computing system. The user computing device can initiate a discovery protocol to search for the package computing device and verify that the package computing device is in the proximity of the user computing device with a sufficient signal strength. Then the user computing device can transmit an indication of a successful delivery to the remote computing system.

An example process for confirming that a delivery computing device has arrived at a delivery location can include a remote computing system transmitting delivery computing device access point data to a user computing device when a delivery is scheduled. The delivery computing device can enable an access point when the delivery computing device enters a geographic region associated with a delivery location. The user computing device can continuously discovery and/or scan for the access point of the delivery computing device. After the user computing device identifies the access point of the delivery computing device, the user computing device can transmit an indication that the delivery computing device has arrived at the delivery location.

Another example process for confirming that a delivery computing device has arrived at a delivery location can include a remote computing system transmitting user computing device access point data to a delivery computing device when a delivery is scheduled. The remote computing system can transmit instructions to the user computing device to enable an access point when the delivery computing device enters a geographic region associated with a delivery location. The delivery computing device can continuously or periodically discovery and/or scan for the access point of the user computing device when the delivery computing device enters the geographic region associated with the delivery location. After the delivery computing device identifies the access point of the user computing device, the delivery computing device can transmit an indication that the delivery computing device has arrived at the delivery location.

Figure 11:
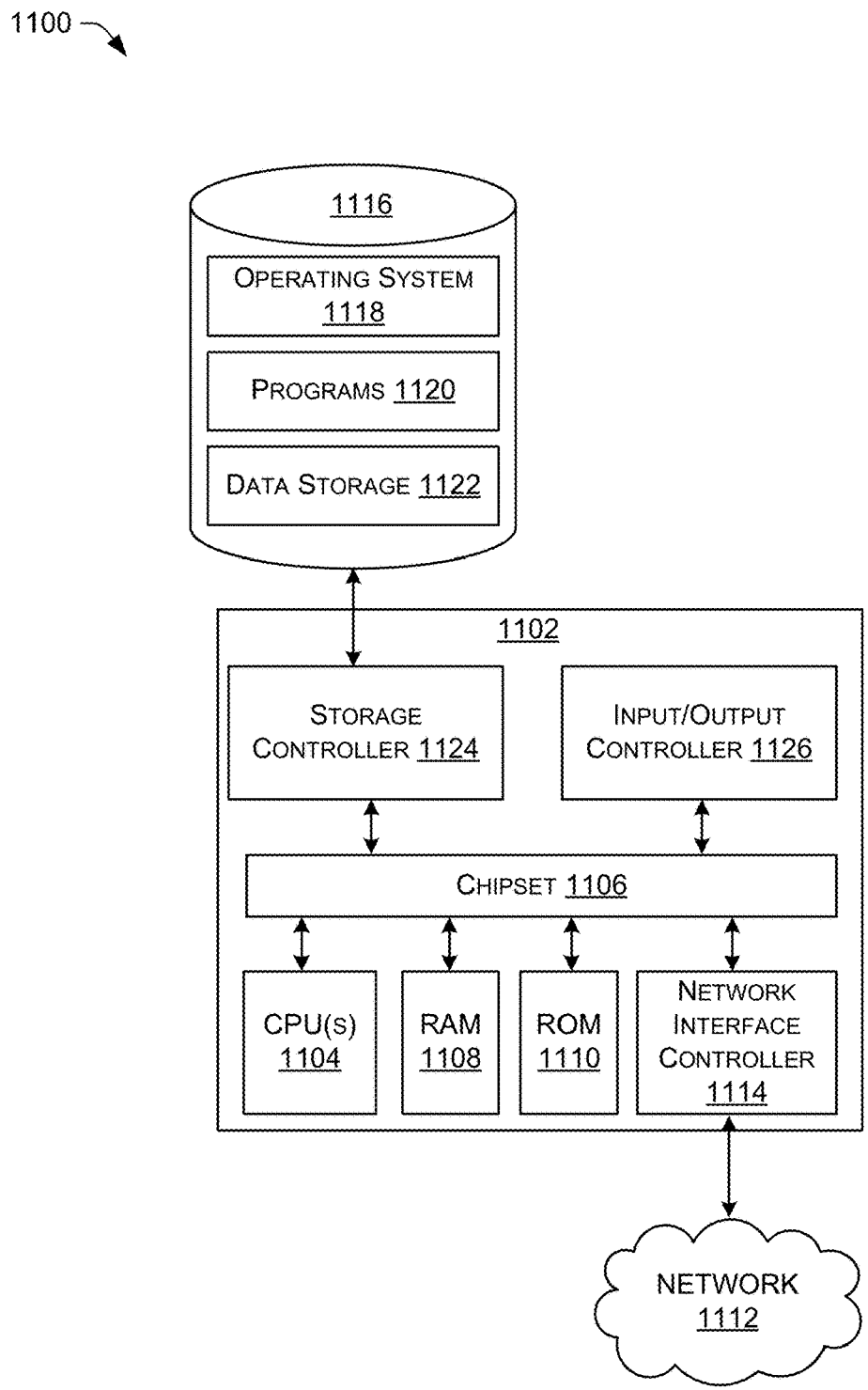
FIG. 11 is a computer architecture diagram showing an illustrative computer hardware architecture for implementing a computing device that can be utilized to implement aspects of the various technologies presented herein.

FIG. 11 is an example computer architecture for a computer 1100 capable of executing program components for implementing the functionality described above. The computer architecture shown in FIG. 11 illustrates a conventional server computer, workstation, desktop computer, laptop computer, tablet, network appliance, eBook reader device, smartphone, smart speaker, smart display, television, wearable device (e.g., a watch, an activity tracker, smart glasses, etc.), or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing systems and computer systems through a network, such as the network 1112. The chipset 1106 can include functionality for providing network connectivity through a network interface controller (NIC) 1114, such as a gigabit Ethernet adapter. The NIC 1114 is capable of connecting the computer 1100 to other computing devices over the network 1112. It should be appreciated that more than one NIC 1114 can be present in the computer 1100, connecting the computer to other types of networks and remote computer systems.

The computer 1100 can be connected to a mass storage device 1116 that provides non-volatile storage for the computer. The mass storage device 1116 can store an operating system 1118, programs 1120, and data storage 1122, which have been described in greater detail herein. The mass storage device 1116 can be connected to the computer 1100 through a storage controller 1124 connected to the chipset 1106. The mass storage device 1116 can consist of one or more physical storage units. The storage controller 1124 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1116 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1116 is characterized as primary or secondary storage, and the like.

For example, the computer 1100 can store information to the mass storage device 1116 by issuing instructions through the storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1116 by detecting the physical states or characteristics of one or more particular locations within the physical storage units.

In addition to the mass storage device 1116 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1116 can store an operating system 1118 utilized to control the operation of the computer 1100. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1116 can store other system or application programs and data utilized by the computer 1100.

In one configuration, the mass storage device 1116 or other computer-readable storage media is encoded with computer-executable instructions which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various processes described above. The computer 1100 can also include computer-readable storage media for performing any of the other computer-implemented operations described herein.

The computer 1100 can also include one or more input/output controllers 1126 for receiving and processing input from a number of input devices, such as a keyboard, a mouse, a touchpad, a touch screen, an electronic stylus, or other type of input device. Similarly, one of the one or more input/output controllers 1126 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or can utilize an architecture completely different than that shown in FIG. 11.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
   one or more processors; and
   one or more computer-readable media storing computer-executable instructions that, when executed, cause the one or more processors to perform operations comprising:
   receiving, from a delivery computing device associated with a courier that is currently transporting a package, first data indicating that the delivery computing device has entered a geofence region associated with a delivery location at which the package is to be delivered, wherein the package includes a beacon used to track a current location of the package;
   configuring the delivery computing device to create a Wi-Fi access point using an access point name for the beacon;
   transmitting, to a user computing device of a user associated with the delivery location and based on receiving the first data, instruction data instructing the user computing device to initiate
   a discovery protocol to detect the delivery computing device using Wi-Fi;
   receiving, from the delivery computing device, second data indicating that the delivery computing device has entered a communication region associated with the user computing device;
   transmitting, to the user computing device, a beacon identifier associated with the beacon, the beacon identifier corresponding to the access point name;

receiving, from the user computing device, verification data indicating that the user computing device has detected the beacon; and determining, based on the verification data, a delivery confirmation of the package at the delivery location.

2. The system as recited in claim 1, the operations further comprising, prior to configuring the delivery computing device to create the Wi-Fi access point, determining that the user computing device is unable to create the Wi-Fi access point.

3. The system as recited in claim 1, wherein the verification data is first verification data and the user computing device is a first user computing device, the operations further comprising:

receiving, from a second user computing device that is associated with the user and that includes a camera, second verification data indicating a detection of the package at the delivery location, the second verification data comprising one or more images that depict the package.

4. The system as recited in claim 1, wherein the verification data further indicates that the user computing device has detected broadcast data comprising the beacon identifier using wireless communications.

5. The system as recited in claim 1, the operations further comprising:

determining an order of an item that is to be included within the package, wherein the order is associated with the user; and associating the beacon with the package based on one of:
  a preference of the user associated with the order indicating a use of the beacon;
  a cost associated with the item;
  an occupancy density associated with a delivery region of the delivery location; or
  a network connection availability associated with the delivery location.

6. A method comprising:

determining an occupancy density associated with a delivery region of a delivery location at which a package is to be delivered by a delivery computing device;

configuring the delivery computing device to initiate a Wi-Fi access point using an access point name, the access point name corresponding to a package device identifier of a package device that is associated with the package;

transmitting, to a user computing device associated with a user, instruction data that instructs the user computing device to initiate a discovery protocol to detect the delivery computing device using Wi-Fi, wherein the user is associated with the delivery location;

receiving, from the user computing device, a package device identifier request for the package device identifier;

transmitting, to the user computing device and based at least in part on the package device identifier request, the access point name corresponding to the package device identifier;

receiving, from the user computing device, verification data indicating that the user computing device has detected the package device; and determining, based at least in part on the verification data, a delivery confirmation indicating a delivery of the package at the delivery location.

7. The method as recited in claim 6, wherein the discovery protocol associates the delivery computing device with a courier that is to deliver the package.

8. The method as recited in claim 6, further comprising:

determining an order of an item that is to be included within the package, wherein the order is associated with the user; and associating a package computing device with the package based on one of:
  a preference of the user associated with the order indicating a use of the package computing device;
  a cost associated with the item;
  an occupancy density associated with the delivery region of the delivery location; or
  a network connection availability associated with the delivery location.

9. The method as recited in claim 8, further comprising:

determining a broadcast attribute that is associated with the package computing device and that controls a wireless communication of the package computing device, the broadcast attribute comprising at least one of:
  a broadcast power indicating a strength of the wireless communication; or
  a broadcast interval indicating an interval for wireless communication, wherein determining the broadcast attribute is based on at least one of:
  an occupancy density associated with the delivery location;
  a battery power associated with the package computing device; or
  a transit time associated with the delivery of the package.

10. The method as recited in claim 9, further comprising:

determining the delivery region associated with the delivery location;

determining a number of potential delivery locations associated with the delivery region, the number of potential delivery locations based at least in part on one of:
  map data indicating the number of potential delivery locations, or
  customer data indicating a number of customers associated with the delivery region; and determining, based at least in part on the delivery region and the number of potential delivery locations, the occupancy density.

11. The method as recited in claim 6, further comprising:

determining a set of user computing devices associated with the user; and determining a capability of the user computing device of the set of user computing devices, the capability indicating that the user computing device is configured to detect the package device, wherein transmitting, to the user computing device, the instruction data is based at least in part on the capability of the user computing device.

12. The method as recited in claim 6, further comprising:

determining an estimated delivery time of the package, wherein transmitting the instruction data is based at least in part on the estimated delivery time.

13. The method as recited in claim 6, further comprising, prior to configuring the delivery computing device to initiate the Wi-Fi access point, determining that the user computing device is unable to create the Wi-Fi access point.

14. The method as recited in claim 6, wherein the verification data is first verification data and the user computing device is a first user computing device, further comprising:
receiving, from a second user computing device that is associated with the user and that includes a camera, second verification data indicating a detection of the package at the delivery location, the second verification data comprising one or more images that depict the package.

15. A system of a user computing device comprising:
one or more processors; and
one or more computer-readable media storing computer-executable instructions that, when executed, cause the one or more processors to perform operations comprising:
receiving, from a remote computing system, instruction data to initiate a first communication protocol comprising:
a discovery protocol to detect, using Wi-Fi, a courier access point name created by a delivery computing device associated with a courier that is to deliver a package to a delivery location;
determining, based at least in part on detecting the courier access point name according to the first communication protocol, that the delivery computing device is within a first communication range from the user computing device;
determining identification data associated with a package computing device associated with the package;
determining, based at least in part on a second communication protocol, that the package computing device is within a second communication range from the user computing device, wherein the second communication protocol comprises determining a broadcast signal strength associated with the package computing device; and
transmitting, to the remote computing system, verification data indicating that the package computing device is within the second communication range.

16. The system as recited in claim 15, wherein the discovery protocol comprises detecting, by the user computing device, a first set of data packets transmitted by the delivery computing device, and wherein the broadcast protocol comprises transmitting, by the user computing device, a second set of data packets.

17. The system as recited in claim 15, wherein determining the identification data comprises:
transmitting, to the remote computing system, a request for the identification data; and
receiving, from the remote computing system, the identification data.

18. The system as recited in claim 15, wherein determining that the package computing device is within the second communication range comprises:
determining a predefined signal strength associated with the package computing device;
and
determining that the broadcast signal strength meets or exceeds a signal strength threshold, wherein the signal strength threshold is based at least in part on the predefined signal strength.

19. The system as recited in claim 18, wherein the instruction data comprises the courier access point name.

20. The system as recited in claim 15, wherein the verification data is first verification data and the user computing device is a first user computing device, the operations further comprising:
receiving, from a second user computing device that includes a camera, second verification data indicating a visual detection of the package at the delivery location, the second verification data comprising one or more images that depict the package.

* * * * *